US012739114B2

(12) United States Patent
Davidson et al.

(10) Patent No.: US 12,739,114 B2
(45) Date of Patent: Sep. 15, 2026

(54) SYSTEM AND METHODS FOR A CONTROL PLANE TO CRYPTOGRAPHICALLY REVOKE THE TRUST OF ANONYMOUS SOFTWARE ARTIFACTS OR DEVICES

(71) Applicant: Dell Products L.P., Round Rock, TX (US)

(72) Inventors: Michal Davidson, Beit Shemesh (IL); Alan White, Glasgow (GB)

(73) Assignee: Dell Peoducts L.P., Round Rock, TX (US)

( * ) Notice: Subject to any disclaimer, the term of this patent is extended or adjusted under 35 U.S.C. 154(b) by 165 days.

(21) Appl. No.: 18/423,358

(22) Filed: Jan. 26, 2024

(65) Prior Publication Data

US 2025/0247224 A1 Jul. 31, 2025

(51) Int. Cl.
*H04L 9/08* (2006.01)
*H04L 9/32* (2006.01)

(52) U.S. Cl.
CPC .......... *H04L 9/0891* (2013.01); *H04L 9/0825* (2013.01); *H04L 9/3213* (2013.01); *H04L 9/3247* (2013.01)

(58) Field of Classification Search
CPC ... H04L 9/3247; H04L 9/0825; H04L 9/0891; H04L 9/3213
See application file for complete search history.

(56) References Cited

U.S. PATENT DOCUMENTS 6,076,078 A * 6/2000 Camp .................... H04L 9/3236 705/76
7,360,080 B2 * 4/2008 Camnisch ............. H04L 9/3263 705/74
8,078,876 B2 * 12/2011 Brickell ................ H04L 9/3255 713/168
8,839,381 B2 * 9/2014 Nguyen ................ H04L 9/3218 726/5
10,505,929 B2 * 12/2019 Mehta ................. H04L 63/0807
11,451,519 B2 * 9/2022 Hwang ............... H04L 63/0884
2003/0177352 A1 * 9/2003 Camenisch ........... H04L 9/3218 713/158
2006/0288073 A1 * 12/2006 Bansod ................. H04L 63/061 709/204
2009/0141707 A1 * 6/2009 Kavanaugh ......... H04L 63/0823 370/352
2013/0125223 A1 * 5/2013 Sorotokin ............. H04L 9/3213 713/168
2014/0173754 A1 * 6/2014 Barbir ................. H04L 63/0815 726/28

(Continued)

*Primary Examiner* — Mohammad A Siddiqi
(74) *Attorney, Agent, or Firm* — Fogarty LLP

(57) ABSTRACT

Systems and methods for a control plane to cryptographically trust and revoke the trust of anonymous software artifacts or devices are described. In an illustrative, non-limiting embodiment, an Information Handling System (IHS) may include: a processor; and a memory coupled to the processor, where the memory includes program instructions stored thereon that, upon execution by the processor, cause a control plane of the IHS to: establish a trust relationship with a requesting entity based, at least in part, on a received anonymous token of a distributed anonymous token set package; receive a second request from the requesting entity; and subsequent to the second request, determine to revoke the trust relationship with the requesting entity.

18 Claims, 9 Drawing Sheets

(56) References Cited

U.S. PATENT DOCUMENTS

| | | | | |
|---|---|---|---|---|
| 2016/0246985 | A1 * | 8/2016 | Burkhardt | G06F 21/64 |
| 2017/0141927 | A1 * | 5/2017 | Apte | H04L 9/3263 |
| 2019/0303589 | A1 * | 10/2019 | Tam | H04L 67/02 |
| 2023/0273808 | A1 * | 8/2023 | Atamli | G06F 21/53 718/1 |

* cited by examiner

SYSTEM AND METHODS FOR A CONTROL PLANE TO CRYPTOGRAPHICALLY REVOKE THE TRUST OF ANONYMOUS SOFTWARE ARTIFACTS OR DEVICES

FIELD

This disclosure relates generally to Information Handling Systems (IHSs), and more specifically, to systems and methods for a control plane to cryptographically trust and revoke the trust of anonymous software artifacts or devices.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use, such as financial transaction processing, airline reservations, enterprise data storage, or global communications. In addition, IHSs may include a variety of hardware and software components that may be configured to process, store, and communicate information and may include one or more computer systems, data storage systems, and networking systems.

Control planes are present in a myriad of different types of systems. For example, in computing, the control plane is the part of the software that configures and shuts down the data plane. By contrast, the data plane is the part of the software that processes the data requests. The data plane is also sometimes referred to as the forwarding plane. The data plane can therefore be optimized for speed of processing, and for simplicity and regularity. The control plane can be optimized for customizability, handling policies, handling exceptional situations, and in general facilitating and simplifying the data plane processing. The conceptual separation of the data plane from the control plane has occurred for many years. An early example is the Unix operating system, where the basic file operations are (open, close) for the control plane and (read, write) for the data plane.

SUMMARY

Systems and methods for a control plane to cryptographically trust and revoke the trust of anonymous software artifacts or devices are described. In an illustrative, non-limiting embodiment, an Information Handling System (IHS) may include: a processor; and a memory coupled to the processor, where the memory includes program instructions stored thereon that, upon execution by the processor, cause a control plane of the IHS to: establish a trust relationship with a requesting entity based, at least in part, on a received anonymous token of a distributed anonymous token set package; receive a second request from the requesting entity; and subsequent to the second request, determine to revoke the trust relationship with the requesting entity.

In some embodiments, the requesting entity includes a software artifact or a device of a system including the IHS. In some embodiments, the second request includes a second anonymous token of the distributed anonymous token set package. In some embodiments, the distributed anonymous token set package includes an anonymous token set including a plurality of anonymous tokens, including the anonymous token, where the second request includes an identifier of the anonymous token set of the distributed anonymous token set package, and where the second request does not include any of the plurality of anonymous tokens of the distributed anonymous token set package.

In some embodiments, the distributed anonymous token set package includes an anonymous token set including a plurality of anonymous tokens, including the anonymous token, where to establish the trust relationship with the requesting entity, the program instructions further cause the control plane of the IHS to: provide a license to the requesting entity, where the license includes an identifier of the anonymous token set, information regarding an expiration date or time, a refresh period, and a signature of the control plane; and where the second request includes a refresh request for the license. In some of these embodiments, the refresh request includes the identifier of the anonymous token set, the refresh period, and a signature using a public key of the control plane.

In another illustrative, non-limiting embodiment, a method includes: establishing, by a control plane of a system, a trust relationship with a requesting entity based, at least in part, on a received anonymous token of a distributed anonymous token set package; receiving, by the control plane, a second request from the requesting entity; and subsequent to receiving the second request, determining, by the control plane, to revoke the trust relationship with the requesting entity.

In some embodiments, the method further includes: revoking, by the control plane, the trust relationship with the requesting entity. In some embodiments, the requesting entity includes a software artifact or a device of the system. In some embodiments, the second request includes a second anonymous token of the distributed anonymous token set package. In some embodiments, the distributed anonymous token set package includes an anonymous token set including a plurality of anonymous tokens, including the anonymous token, where the second request includes an identifier of the anonymous token set of the distributed anonymous token set package, and where the second request does not include any of the plurality of anonymous tokens of the distributed anonymous token set package.

In some embodiments, the distributed anonymous token set package includes an anonymous token set including a plurality of anonymous tokens, including the anonymous token, where the second request includes a second anonymous token of the anonymous token set or an identifier of the anonymous token set, and where determining to revoke the trust relationship with the requesting entity further includes: determining, by the control plane, that at least one anonymous token of the anonymous token set was identified as being used maliciously; and determining, by the control plane, to revoke the trust relationship with the requesting entity based, at least in part, on the determining that at least one anonymous token of the anonymous token set was identified as being used maliciously.

In some embodiments, the distributed anonymous token set package includes an anonymous token set including a plurality of anonymous tokens, including the anonymous token, where establishing the trust relationship with the requesting entity further includes: providing, by the control plane, a license to the requesting entity; and where the second request includes a refresh request for the license. In some of these embodiments, the license includes an identifier of the anonymous token set, information regarding an expiration date or time, a refresh period, and a signature of the control plane, where the refresh request includes the identifier of the anonymous token set, the refresh period, and a signature using a public key of the control plane.

In some embodiments, determining to revoke the trust relationship with the requesting entity further includes: determining, by the control plane, to not renew the license of the refresh request. In some embodiments, the refresh request for the license includes an identifier of the anonymous token set, where determining to revoke the trust relationship with the requesting entity further includes: determining, by the control plane, that at least one anonymous token of the plurality of anonymous tokens of the anonymous token set was identified as being used maliciously; and determining, by the control plane, to revoke the trust relationship with the requesting entity based, at least in part, on the determining that at least one anonymous token of the anonymous token set was identified as being used maliciously.

In some embodiments, establishing the trust relationship with the requesting entity further includes: receiving, by the control plane, the anonymous token of the distributed anonymous token set package from the requesting entity in a first request; verifying, by the control plane, the anonymous token; and subsequent to verifying the anonymous token, establishing the trust relationship with the requesting entity. In some of these embodiments, prior to receiving the anonymous token from the requestor, the method further includes: generating, at the control plane, an anonymous token set including a plurality of anonymous tokens, including the anonymous token; generating, at the control plane, the anonymous token set package including the anonymous token set; encrypting, by the control plane, the anonymous token set package; and distributing, by the control plane, the encrypted anonymous token set package to a software artifact, a software deployment orchestrator, a device, or a user.

In another illustrative, non-limiting embodiment, one or more non-transitory computer-readable storage media store program instructions that when executed on or across one or more processors of an Information Handling System (IHS), cause the one or more processors to: establish a trust relationship with a requesting entity based, at least in part, on a received first anonymous token of an anonymous token set of a distributed anonymous token set package; receive a second request including either a second anonymous token of the anonymous token set, or an identifier of the anonymous token set; and subsequent to receiving the second request, determine to revoke the trust relationship with the requesting entity.

In some embodiments, to determine to revoke the trust relationship with the requesting entity, the program instructions further cause the one or more processors to: determine that at least one anonymous token of the anonymous token set was identified as being used maliciously; and determine to revoke the trust relationship with the requesting entity based, at least in part, on the determination that at least one anonymous token of the anonymous token set was identified as being used maliciously.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

Embodiments of an Information Handling System

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price.

An IHS may include Random Access Memory (RAM), one or more processing resources such as a Central Processing Unit (CPU) or hardware or software control logic, Read-Only Memory (ROM), and/or other types of nonvolatile memory. Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components.

Figure 1:
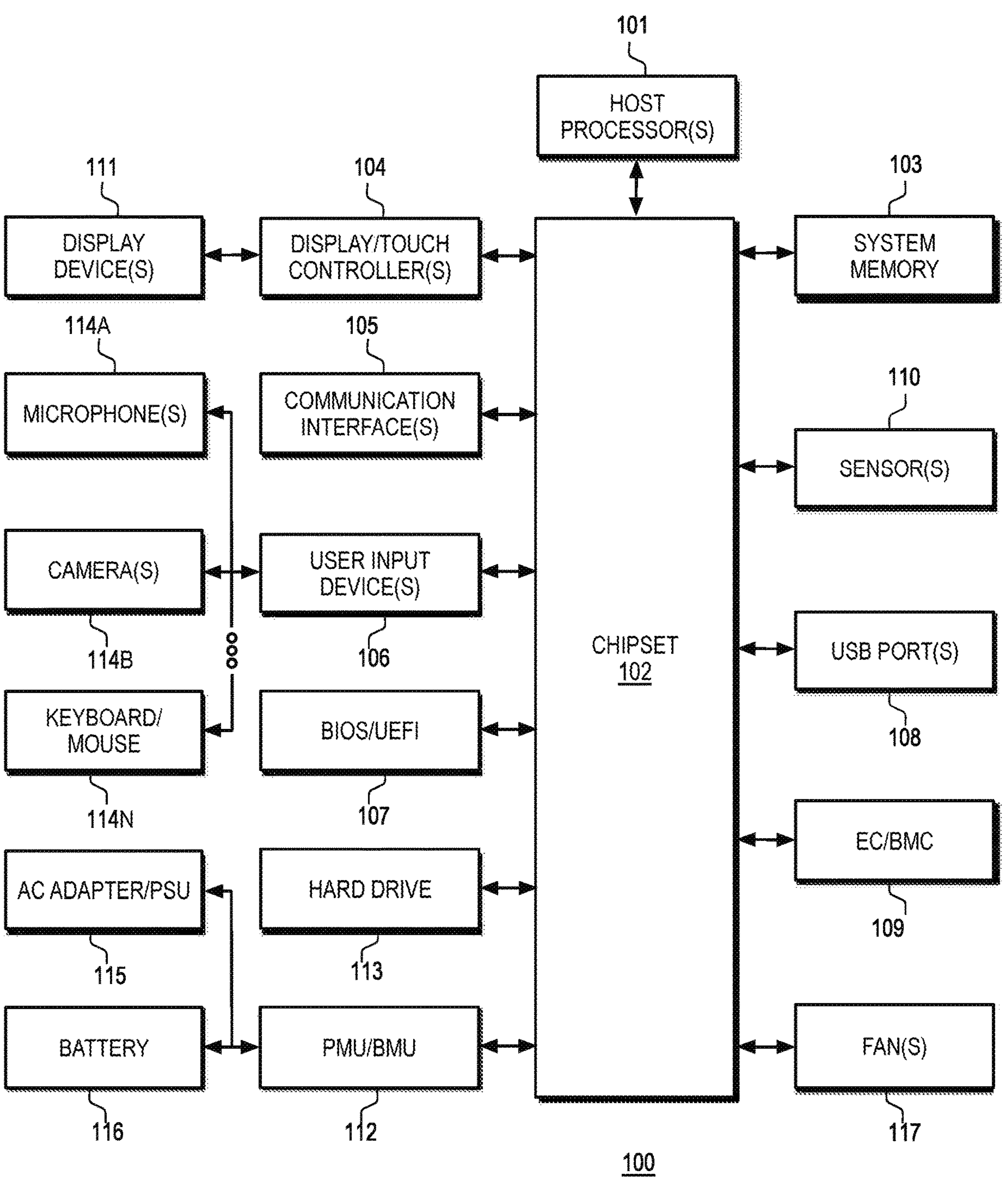
FIG. 1 is a diagram illustrating examples of hardware components of an Information Handling System (IHS), according to some embodiments.

FIG. 1 is a block diagram of hardware components of IHS 100, which may be used to implement the systems and methods for a control plane to cryptographically trust and revoke the trust of anonymous software artifacts or devices.

As depicted, IHS 100 includes host processor(s) 101. In various embodiments, IHS 100 may be a single-processor system, or a multi-processor system including two or more processors. Host processor(s) 101 may include any processor capable of executing program instructions, such as a PENTIUM processor, or any general-purpose or embedded processor implementing any of a variety of Instruction Set Architectures (ISAs), such as an x86 or a Reduced Instruction Set Computer (RISC) ISA (e.g., POWERPC, ARM, SPARC, MIPS, etc.).

IHS 100 includes chipset 102 coupled to host processor(s) 101. Chipset 102 may provide host processor(s) 101 with access to several resources. In some cases, chipset 102 may utilize a QuickPath Interconnect (QPI) bus to communicate with host processor(s) 101.

Chipset 102 may also be coupled to communication interface(s) 105 to enable communications between IHS 100 and various wired and/or wireless networks, such as Ethernet, WiFi, BLUETOOTH (BT), cellular or mobile networks (e.g., Code-Division Multiple Access or "CDMA," Time-Division Multiple Access or "TDMA," Long-Term Evolution or "LTE," etc.), satellite networks, or the like. Communication interface(s) 105 may also be used to communicate with certain peripherals devices (e.g., BT speakers, microphones, headsets, etc.). Moreover, communication interface(s) 105 may be coupled to chipset 102 via a Peripheral Component Interconnect Express (PCIe) bus, or the like.

Chipset 102 may be coupled to display/touch controller(s) 104, which may include one or more or Graphics Processor Units (GPUs) on a graphics bus, such as an Accelerated Graphics Port (AGP) or PCIe bus. As shown, display/touch controller(s) 104 provide video or display signals to one or more display device(s) 111.

Display device(s) 111 may include Liquid Crystal Display (LCD), Light Emitting Diode (LED), organic LED (OLED), or other thin film display technologies. Display device(s) 111 may include a plurality of pixels arranged in a matrix, configured to display visual information, such as text, two-dimensional images, video, three-dimensional images, etc. In some cases, display device(s) 111 may be provided as a single continuous display, or as two or more discrete displays.

Chipset 102 may provide host processor(s) 101 and/or display/touch controller(s) 104 with access to system memory 103. In various embodiments, system memory 103 may be implemented using any suitable memory technology, such as static RAM (SRAM), dynamic RAM (DRAM) or magnetic disks, or any nonvolatile/Flash-type memory, such as a solid-state drive (SSD) or the like.

Chipset 102 may also provide host processor(s) 101 with access to one or more Universal Serial Bus (USB) ports 108, to which one or more peripheral devices may be coupled (e.g., integrated or external webcams, microphones, speakers, etc.).

Chipset 102 may further provide host processor(s) 101 with access to one or more hard disk drives, solid-state drives, optical drives, or other removable-media drives 113.

Chipset 102 may also provide access to one or more user input devices 106, for example, using a super I/O controller or the like. Examples of user input devices 106 include, but are not limited to, microphone(s) 114A, camera(s) 114B, and keyboard/mouse 114N. Other user input devices 106 may include a touchpad, stylus or active pen, totem, etc.

Each of user input devices 106 may include a respective controller (e.g., a touchpad may have its own touchpad controller) that interfaces with chipset 102 through a wired or wireless connection (e.g., via communication interfaces(s) 105). In some cases, chipset 102 may also provide access to one or more user output devices (e.g., video projectors, paper printers, 3D printers, loudspeakers, audio headsets, Virtual/Augmented Reality (VR/AR) devices, etc.)

In certain embodiments, chipset 102 may further provide an interface for communications with hardware sensors 110.

Sensors 110 may be disposed on or within the chassis of IHS 100, or otherwise coupled to IHS 100, and may include, but are not limited to: electric, magnetic, radio, optical (e.g., camera, webcam, etc.), infrared, thermal (e.g., thermistors etc.), force, pressure, acoustic (e.g., microphone), ultrasonic, proximity, position, deformation, bending, direction, movement, velocity, rotation, gyroscope, Inertial Measurement Unit (IMU), and/or acceleration sensor(s).

Upon booting of IHS 100, host processor(s) 101 may utilize program instructions of Basic Input/Output System (BIOS) 107 to initialize and test hardware components coupled to IHS 100 and to load host OS 400 (FIG. 4) for use by IHS 100. BIOS 107 provides an abstraction layer that allows host OS 400 to interface with certain IHS components 100. Relying upon the hardware abstraction layer provided by BIOS 107, software stored in system memory 103 and executed by host processor(s) 101 can interface with certain I/O devices that are coupled to IHS 100.

The Unified Extensible Firmware Interface (UEFI) was designed as a successor to BIOS. As a result, many modern IHSs utilize UEFI in addition to or instead of a BIOS. As used herein, BIOS 107 is intended to also encompass a UEFI component.

Embedded Controller (EC) or Baseboard Management Controller (BMC) 109 is operational from the very start of each IHS power reset and handles various tasks not ordinarily handled by host processor(s) 101. Examples of these operations may include, but are not limited to: receiving and processing signals from a keyboard or touchpad, as well as other buttons and switches (e.g., power button, laptop lid switch, etc.), receiving and processing thermal measurements (e.g., performing fan control, CPU and GPU throttling, and emergency shutdown), controlling indicator LEDs (e.g., caps lock, scroll lock, num lock, battery, ac, power, wireless LAN, sleep, etc.), managing PMU/BMU 112, alternating current (AC) adapter/Power Supply Unit (PSU) 115 and/or battery 116, allowing remote diagnostics and remediation over network(s) 103, etc.

For example, EC/BMC 109 may implement operations for interfacing with power adapter/PSU 115 in managing power for IHS 100. Such operations may be performed to determine the power status of IHS 100, such as whether IHS 100 is operating from AC adapter/PSU 115 and/or battery 116.

Firmware instructions utilized by EC/BMC 109 may also be used to provide various core operations of IHS 100, such as power management and management of certain modes of IHS 100 (e.g., turbo modes, maximum operating clock frequencies of certain components, etc.).

In addition, EC/BMC 109 may implement operations for detecting certain changes to the physical configuration or posture of IHS 100. For instance, when IHS 100 as a 2-in-1 laptop/tablet form factor, EC/BMC 109 may receive inputs from a lid position or hinge angle sensor 110, and it may use those inputs to determine: whether the two sides of IHS 100 have been latched together to a closed position or a tablet position, the magnitude of a hinge or lid angle, etc. In response to these changes, the EC may enable or disable certain features of IHS 100 (e.g., front or rear facing camera, etc.).

In some cases, EC/BMC 109 may be configured to identify any number of IHS postures, including, but not limited to: laptop, stand, tablet, tent, or book. For example, when display(s) 111 of IHS 100 is open with respect to a horizontal keyboard portion, and the keyboard is facing up, EC/BMC 109 may determine IHS 100 to be in a laptop posture. When display(s) 111 of IHS 100 is open with respect to the horizontal keyboard portion, but the keyboard is facing down (e.g., its keys are against the top surface of a table), EC/BMC 109 may determine IHS 100 to be in a stand posture.

When the back of display(s) 111 is closed against the back of the keyboard portion, EC/BMC 109 may determine IHS 100 to be in a tablet posture. When IHS 100 has two display(s) 111 open side-by-side, EC/BMC 109 may determine IHS 100 to be in a book posture. When IHS 100 has two displays open to form a triangular structure sitting on a horizontal surface, such that a hinge between the displays is at the top vertex of the triangle, EC/BMC 109 may determine IHS 100 to be in a tent posture. In some implementations, EC/BMC 109 may also determine if display(s) 111 of IHS 100 are in a landscape or portrait orientation.

In some cases, EC/BMC 109 may be installed as a Trusted Execution Environment (TEE) component to the motherboard of IHS 100.

Additionally, or alternatively, EC/BMC 109 may be configured to calculate hashes or signatures that uniquely identify individual components of IHS 100. In such scenarios, EC/BMC 109 may calculate a hash value based on the configuration of a hardware and/or software component coupled to IHS 100. For instance, EC/BMC 109 may calculate a hash value based on all firmware and other code or settings stored in an onboard memory of a hardware component.

Hash values may be calculated as part of a trusted process of manufacturing IHS 100 and may be maintained in secure storage as a reference signature. EC/BMC 109 may later recalculate the hash value for a component may compare it against the reference hash value to determine if any modifications have been made to the component, thus indicating that the component has been compromised. In this manner, EC/BMC 109 may validate the integrity of hardware and software components installed in IHS 100.

In various embodiments, IHS 100 may be coupled to an external power source (e.g., AC outlet or mains) through AC adapter/PSU 115. AC adapter/PSU 115 may include an adapter portion having a central unit (e.g., a power brick, wall charger, or the like) configured to draw power from an AC outlet via a first electrical cord, convert the AC power to direct current (DC) power, and provide DC power to IHS 100 via a second electrical cord.

Additionally, or alternatively, AC adapter/PSU 115 may include an internal or external power supply portion (e.g., a switching power supply, etc.) connected to the second electrical cord and configured to convert AC to DC. AC adapter/PSU 115 may also supply a standby voltage, so that most of IHS 100 can be powered off after preparing for hibernation or shutdown, and powered back on by an event (e.g., remotely via wake-on-LAN, etc.). In general, AC adapter/PSU 115 may have any specific power rating, measured in volts or watts, and any suitable connectors.

IHS 100 may also include internal or external battery 116. Battery 116 may include, for example, a Lithium-ion or Li-ion rechargeable device capable of storing energy sufficient to power IHS 100 for an amount of time, depending upon the IHS's workloads, environmental conditions, etc. In some cases, a battery pack may also contain temperature sensors, voltage regulator circuits, voltage taps, and/or charge-state monitors.

Power Management Unit (PMU) 112 governs power functions of IHS 100, including AC adapter/PSU 115 and battery 116. For example, PMU 112 may be configured to: monitor power connections and battery charges, charge battery 116, control power to other components, devices, or ICs, shut down components when they are left idle, control sleep and power functions ("on" and "off"), manage interfaces for built-in keypad and touchpads, regulate real-time clocks (RTCs), etc.

In some implementations, PMU 112 may include one or more Power Management Integrated Circuits (PMICs) configured to control the flow and direction or electrical power in IHS 100. Particularly, a PMIC may be configured to perform battery management, power source selection, voltage regulation, voltage supervision, undervoltage protection, power sequencing, and/or charging operations. It may also include a DC-to-DC converter to allow dynamic voltage scaling, or the like.

Additionally, or alternatively, PMU 112 may include a Battery Management Unit (BMU) (referred to collectively as "PMU/BMU 112"). AC adapter/PSU 115 may be removably coupled to a battery charge controller within PMU/BMU 112 to provide IHS 100 with a source of DC power from battery cells within battery 116 (e.g., a lithium ion (Li-ion) or nickel metal hydride (NiMH) battery pack including one or more rechargeable batteries). PMU/BMU 112 may include non-volatile memory and it may be configured to collect and store battery status, charging, and discharging information, and to provide that information to other IHS components.

Examples of information collected and stored in a memory within PMU/BMU 112 may include, but are not limited to: operating conditions (e.g., battery operating conditions including battery state information such as battery current amplitude and/or current direction, battery voltage, battery charge cycles, battery state of charge, battery state of health, battery temperature, battery usage data such as charging and discharging data; and/or IHS operating conditions such as processor operating speed data, system power management and cooling system settings, state of "system present" pin signal), environmental or contextual information (e.g., such as ambient temperature, relative humidity, system geolocation measured by GPS or triangulation, time and date, etc.), and BMU events.

Examples of BMU events may include, but are not limited to: acceleration or shock events, system transportation events, exposure to elevated temperature for extended time periods, high discharge current rate, combinations of battery voltage, battery current and/or battery temperature (e.g., elevated temperature event at full charge and/or high voltage causes more battery degradation than lower voltage), etc.

In some embodiments, power draw measurements may be conducted with control and monitoring of power supply via PMU/BMU 112. Power draw data may also be monitored with respect to individual components or devices of IHS 100. Whenever applicable, PMU/BMU 112 may administer the execution of a power policy, or the like.

IHS 100 may also include one or more fans 117 configured to cool down one or more components or devices of IHS 100 disposed inside a chassis, case, or housing. Fan(s) 117 may include any fan inside, or attached to, IHS 100 and used for active cooling. Fan(s) 117 may be used to draw cooler air into the case from the outside, expel warm air from inside, and/or move air across a heat sink to cool a particular IHS component. In various embodiments, both axial and sometimes centrifugal (blower/squirrel-cage) fans may be used.

In other embodiments, IHS 100 may not include all the components shown in FIG. 1. In other embodiments, IHS 100 may include other components in addition to those that are shown in FIG. 1. Furthermore, some components that are represented as separate components in FIG. 1 may instead be integrated with other components, such that all or a portion of the operations executed by the illustrated components may instead be executed by the integrated component.

For example, in various embodiments described herein, host processor(s) 101 and/or other components of IHS 100 (e.g., chipset 102, display/touch controller(s) 104, communication interface(s) 105, EC/BMC 109, etc.) may be replaced by discrete devices within a heterogenous computing platform (e.g., a System-On-Chip or "SoC"). As such, IHS 100 may assume different form factors including, but not limited to: servers, workstations, desktops, laptops, appliances, video game consoles, tablets, smartphones, etc.

Embodiments of Control Planes within Systems that Cryptographically Establish and/or Revoke the Trust of Anonymous Software Artifacts and/or Devices Some embodiments of the present disclosure can operate with regard to control planes for any system. In some embodiments, the system itself can be an IHS 100. In other embodiments, the system can incorporate multiple IHSs. In some embodiments, the system can be a network, including multiple electronic components. In some embodiments, the system can be a provider network, as discussed in more detail with regard to FIG. 3. The system can be any group of interacting or interrelated elements that act according to a set of rules to form a unified whole, and the above examples should not be construed as limiting. According to some embodiments, control planes can use anonymous tokens to cryptographically establish trust in generic software artifacts or devices while preserving anonymity.

Control planes can rely on a pre-provisioned unique secure identity located within the hardware or the firmware of the system. This pre-provisioned unique secure identity can be shared with the control plane either at device manufacturing time or during device registration. This unique secure identity can be a cryptographic identity such as a secret symmetric key protected within a Trusted Platform Module (TPM). This unique secure identity can also be a certificate or public-private key-pair signed by a Certificate Authority (CA) with a shared root-of trust. However, a challenge can be to establish a similar secure establishment of trust with software artifacts or devices, while preserving client anonymity. In other words, a challenge can be allowing the control plane to establish trust in a software artifact or device without relying on a unique identity.

Some embodiments of the present disclosure provide a method for the control plane to use a cryptographically verifiable anonymized token provided by a software artifact or device, in order to trust generic software artifacts/devices. Some embodiments can either provision a control-plane managed anonymized identity, or provide services and communications while supporting the full anonymity of a software artifact/device. In some embodiments, the anonymity of network communications can be performed using one of a number of methods, such as onion routing.

Figure 2:
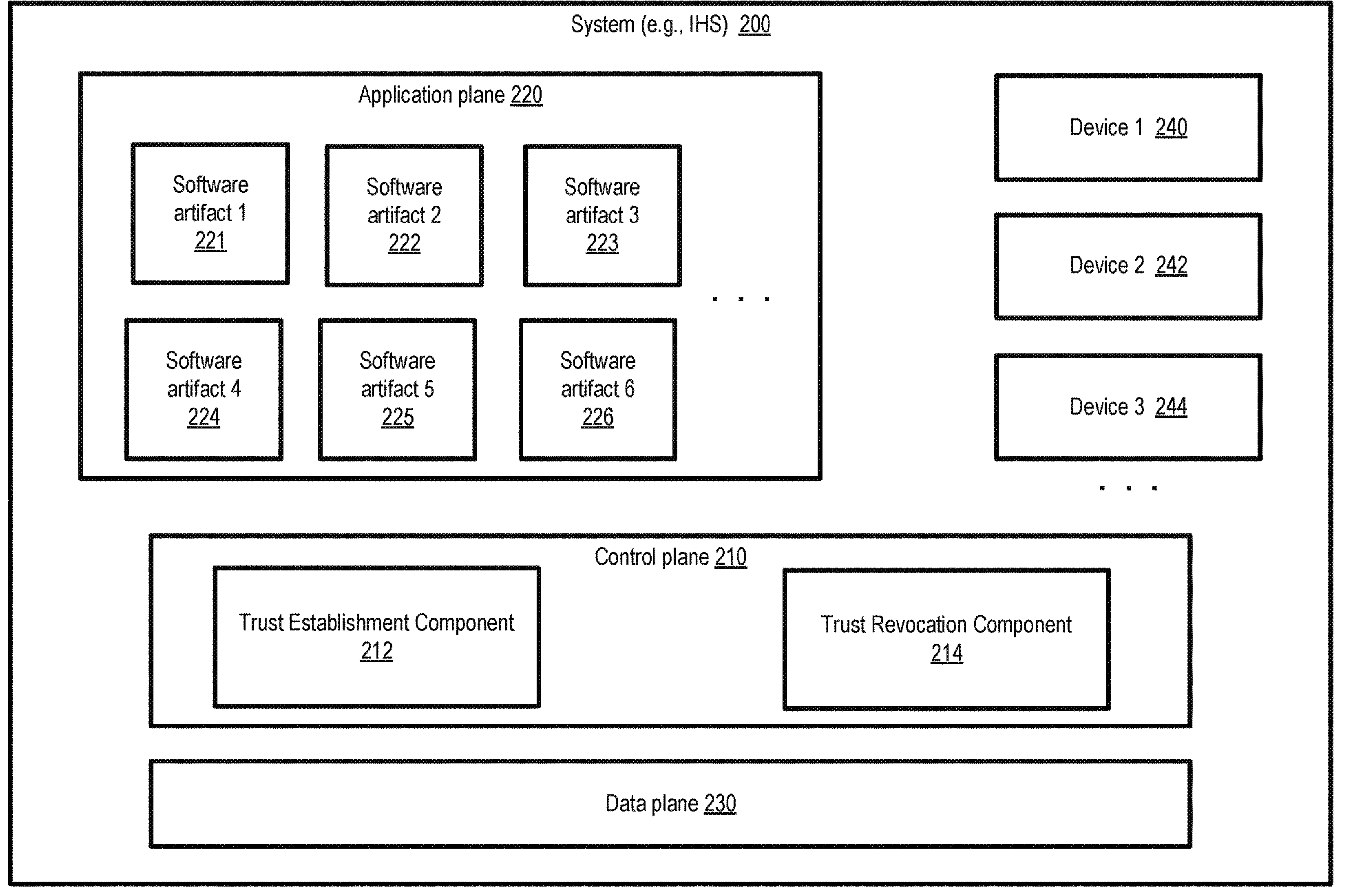
FIG. 2 is a structural diagram illustrating an example of a system for a control plane to cryptographically trust and revoke the trust of anonymous software artifacts or devices, according to some embodiments.

FIG. 2 is a structural diagram illustrating an example of a system 200 for a control plane 210 to cryptographically establish trust and revoke the trust of anonymous software artifacts (221, 222, 223, 224, 225, 226) or devices (240, 242, 244), according to some embodiments. In some embodiments, functionality of the system 200 may be instantiated, at least in part, through the execution of program instructions stored in system memory 103 and executed by host processor(s) 101 of IHS 100.

FIG. 2 depicts a system 200. In some embodiments, the system 200 itself can be an IHS 100. FIG. 2 also depicts a control plane 210, a data plane 230, an application plane 220, and multiple devices (240, 242, 244) of the system 200. In some embodiments, the devices can include display device(s) 111, display/touch controller(s) 104, microphones 114A, communication interface(s) 105, cameras(s) 114B, user input device(s) 106, a keyboard or mouse 114N, an AC adapter or PSU 115, a hard drive 113, a battery 116, a PMU/BMU 112, sensor(s) 110, USB port(s) 108, fan(s), or parts of the chipset 102 of the IHS 100 depicted in FIG. 1.

In FIG. 2, the application plane 220 includes multiple software artifacts (221, 222, 223, 224, 225, 226). In some embodiments, an application plane 220 is a layer of the system 200 that has software artifacts (e.g., applications and/or services) that make requests for functions from the control plane 210 and the data plane 220. The control plane 210 includes a trust establishment component 212 for the control plane 220 to cryptographically trust anonymous software artifacts or devices, and a trust revocation component 214 for a control plane to cryptographically revoke the trust of anonymous software artifacts or devices, according to some embodiments. While the embodiments of FIG. 2 assume the control plane 210 performs the token distribution, the token decryption, and identity establishment via a token, as all occurring in a single component or system (e.g., trust establishment component 212), they could also be performed independently by separate systems, in some embodiments.

Figure 3:
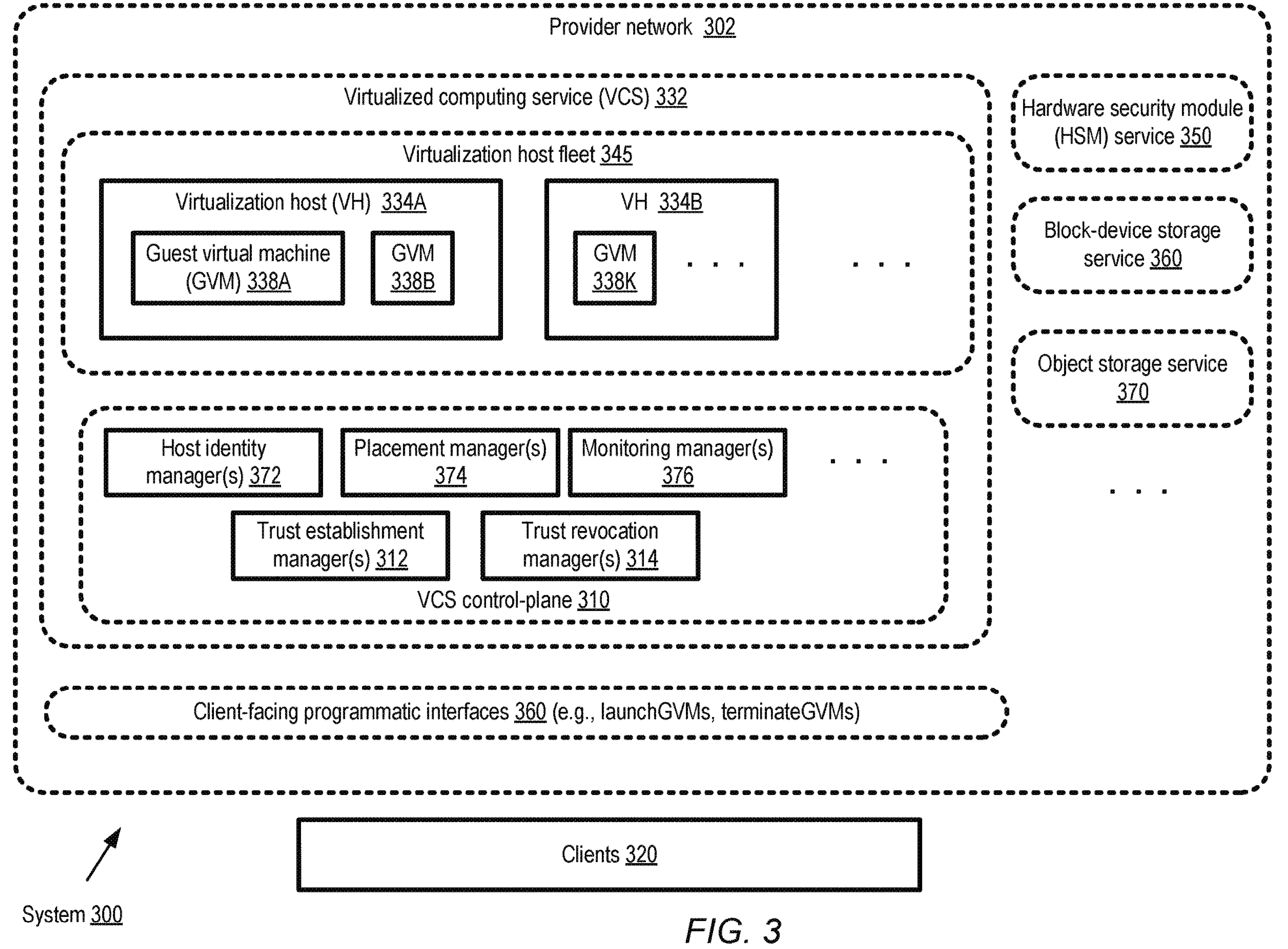
FIG. 3 is a structural diagram illustrating another example of a provider network system in which a virtualized computing service control plane can cryptographically trust and revoke the trust of anonymous software artifacts or devices, according to some embodiments.

FIG. 3 is a structural diagram illustrating another example of a provider network system in which a virtualized computing service control plane can cryptographically trust and revoke the trust of anonymous software artifacts or devices, according to some embodiments. In some embodiments, system 300 may be instantiated, at least in part, through the execution of program instructions stored in system memory 103 and executed by host processor(s) 101 of IHS 100.

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers.

The advent of virtualization technologies for commodity hardware has provided benefits with respect to managing large-scale computing resources for many customers with diverse needs, allowing various computing resources to be efficiently and securely shared by multiple customers. For example, virtualization technologies may allow a single physical virtualization host to be shared among multiple users by providing each user with one or more "guest" virtual machines hosted by the single virtualization host. Each such virtual machine may represent a software simulation acting as a distinct logical computing system that provides users with the illusion that they are the sole operators of a given hardware computing resource, while also providing application isolation and security among the various virtual machines. Instantiating several different virtual machines on the same host may also help increase the overall hardware utilization levels at a data center, leading to higher returns on investment.

A respective virtualization manager, which may for example include an administrative virtual machine instance and/or a hypervisor, may be installed on each virtualization host in various virtualization environments. The virtualization manager may be responsible, among other tasks, for starting/stopping guest virtual machines on the hosts on behalf of customers, acting as the intermediary between the guest virtual machines and various hardware components of the host and the network, collecting metrics pertaining to the guest virtual machines, and enforcing security rules.

A given virtualization host may include one or more primary physical CPUs (central processing units) or cores and a main memory (e.g., including one or more random access memory or RAM devices), in addition to various other hardware components usable for networking, interactive devices and the like in various embodiments. To support guest virtual machines on behalf of various clients, virtualized versions of the CPUs and/or portions of the main memory may be created and allocated to guest virtual machines by components of a virtualization manager, virtualized network devices may be made accessible to the guest virtual machines, and so on. A virtualization manager of the virtualization host may include various combinations of software, firmware and/or hardware components in different embodiments, which collectively enable guest virtual machines to be established and administered on the virtualization host.

In at least some embodiments, the virtualization managers may be implemented at a virtualized computing service of a provider network. Networks set up by an entity such as a company or a public sector organization to provide one or more network-accessible services (such as various types of cloud-based computing or storage services) accessible via the Internet and/or other networks to a distributed set of clients may be termed provider networks herein. A provider network may sometimes be referred to as a "public cloud" environment. The resources of a provider network may in some cases be distributed across multiple data centers, which in turn may be distributed among numerous cities, states and countries. In at least one embodiment, the kinds of virtualization managers described herein may be deployed at hosts which are located at data centers external to a provider network; for example, various administrative or control plane components of a virtualized computing service may be executed within a provider network, and such control plane components may communicate with a partially-offloaded virtualization manager running at a virtualization host located at a customer-owned data center (or at some other premises external to the provider network).

A virtualized computing service may support multi-tenant mode for allotment of guest virtual machines to virtualization hosts in at least some embodiments. In multi-tenant mode, a given virtualization host may be used to instantiate respective guest virtual machines for several different customers. In contrast, in single-tenant mode, which may also or instead be supported in various embodiments, a given virtualization host may be used only for guest virtual machine(s) of a single client. Especially in multi-tenant mode, and even in single tenant mode, ensuring that the security and/or isolation requirements of the clients are met may be critical. From the perspective of the virtualized computing service provider, virtualization manager components should ideally be designed such that their security mechanisms cannot (with a very high probability) be successfully breached as a result of external attacks or bugs. In the rare cases where a breach does occur, the breach should be identified as quickly as possible, and remedial actions to reduce the impact of the breach should be taken (such as disabling or shutting down the virtualization manager).

As shown, system 300 includes a provider network 302 at which a plurality of network-accessible services may be implemented on behalf of various clients 320. The services of the provider network may include, among others, a virtualized computing service (VCS) 332 as well as a number of storage-related services including a block-device storage service 360 (which provides storage volumes via a block-device level programmatic interface) and an object storage service 370 (which exposes a web-service interface for accessing unstructured storage objects) in the depicted embodiment. A number of security-related services, including a hardware security module (HSM) appliance service 350 may also be supported at the provider network in various embodiments. Some of the services may utilize other service to fulfill client requests—e.g., at least a portion of the persistent storage used for guest virtual machines of the virtualized computing service may be obtained via one or more of the storage services in the depicted embodiment, security keys associated with the virtualized computing service may be stored at the HSM service, and so on.

The VCS 332 may include a virtualization host fleet 345 and a control plane fleet 310 in the depicted embodiment. Virtualization hosts 334 of the host fleet 345 may be employed to instantiate guest virtual machines (GVMs) 338. For example, virtualization host 334A may include GVMs 338A and 338B, while virtualization host 334B includes GVM 338K. The GVMs may be utilized by clients 320 to run a variety of applications, some of which may involve the use of resources of other services of the provider network 302, and/or may involve the use of resources outside the provider network 302.

The VCS 332 may implement a set of client-facing programmatic interfaces 360 (e.g., application programming interfaces or APIs, web-based consoles, command line tools, graphical user interfaces and the like) enabling clients 332 to submit requests to acquire, release and interact with guest virtual machines 338 in the depicted embodiment. For example, the equivalent of a "launchGVMs" request or command may be used to instantiate one or more GVMs 338 with specified characteristics, and the equivalent of a "terminateGVMs" command or request may be used to disable one or more of the client's GVMs. In general, a client request, received at a control plane component of the VCS 332 may be transformed into an internal format and transmitted to the PVM at the appropriate virtualization host for implementation.

The control plane fleet 310 of the VCS may include a number of subcomponents in the depicted embodiment, including for example host identity managers 372, placement managers 374, monitoring managers 376, and the like. The host identity managers 372 may enroll the virtualization hosts 334 within a public-key infrastructure of the VCS 332 in the depicted embodiment, so that the security of the communications between the host and various other components of the provider network 302 is enhanced. The placement managers 374 may be responsible for determining exactly which virtualization host(s) are to be used to fulfill a given client's request for one or more GVMs 338. In some cases, virtualization hosts may be used in a multi-tenant mode, with GVMs of several different clients instantiated on a single virtualization host, while in other cases, at least some of the hosts may be dedicated to GVMs of a single client (single-tenant mode). Monitoring managers 376 may collect various metrics (e.g., performance measurements, health state indicators and the like) associated with individual GVMs 338 and/or hosts 334, including metrics which may be initially obtained by subcomponents of the hypervisor.

The control plane fleet 310 can also include trust establishment managers 312 for the control plane to cryptographically trust anonymous software artifacts or devices, and trust revocation managers 314 for the control plane to cryptographically revoke the trust of anonymous software artifacts or devices, according to some embodiments. The trust establishment managers 312 can establish trust with the various services, such as the HSM service 350, the block-device storage service 360, the object storage service 270, in some embodiments. The trust establishment managers 312 can also establish trust with the various virtualization hosts 334, and/or the various guest virtual machines 338, in some embodiments. The trust establishment managers 312 can also establish trust with various clients 320, in some embodiments. The trust revocation managers 314 can revoke the trust of the same services, virtualization hosts, guest virtual machines, or clients, in some embodiments. While the embodiments of FIG. 3 assume the VCS control plane 310 performs the token distribution, the token decryption, and identity establishment via a token, as all occurring in a single system, they could also be performed independently by separate systems, in some embodiments.

The control plane (e.g., control plane 210 or VCS control plane 310) can use a cryptographically verifiable anonymized token provided by a software artifact/device, to establish a trust in the software artifact/device, according to some embodiments. The software artifact's or device's identity does not need to be known to the control plane, in some embodiments, and thus its privacy can be preserved. The anonymous token merely needs to be verifiable and unique, and needs to support a method of enforcing single usage, in some embodiments. This allows utilization of the anonymized token to establish an initial trust between the control plane and the software artifact/device, in these embodiments. This verified trust can then be used either to provision a control plane anonymized managed secure identity at runtime, or merely to establish trust in order to provide services.

Trust can be established between a control plane and a software artifact or device without requiring the knowledge of a unique identity, in some embodiments, and thus software artifact/device anonymity can be preserved. Some embodiments have no requirement for a unique cryptographic identity, such as a pre-serialized secret symmetric key protected within a TPM, or a certificate and public-private key-pair signed by a Certificate Authority with a shared root-of-trust. License cloning and license reuse can be prevented, in some embodiments, without requiring control plane knowledge of a software artifact's identity, thus preserving anonymity.

Some embodiments provide for the usage of anonymous token sets, which are cryptographically protected and verifiable. Anonymous Tokens ("ATs") are a cryptographic protocol that enables propagating trust in a cryptographically secure manner while maintaining anonymity. Anonymous tokens are lightweight anonymous credentials that can be single-use, in some embodiments. At a high level, trust propagation can occur in a two-step manner, in some embodiments. A first step can be in a trusted setting, and a second step can be an untrusted setting. In a trusted setting, a specific user is in the trusted setting with a party that can be denoted as the signer (or also known as the issuer). Here, trust may have been established in a variety of ways (authentication, log-in, etc.). To denote that the user is trusted, the issuer may issue a token to the user. In an untrusted setting, suppose the user is now in the untrusted setting with another party that we denote the verifier. The user is now able to prove that they were trusted by the issuer through the use of the prior received token. By using a cryptographically secure verification process, the verifier can check that the user was once trusted by the issuer.

At a high level, anonymous tokens provide unforgeability and unlinkability privacy guarantees, in some embodiments. With regard to unforgeability, adversarial users are not able to fabricate tokens that will pass the verification step of the verifier. In particular, if a malicious user interacts with the signer K times, then the user cannot generate K+1 tokens that successfully verify. With regard to unlinkability, adversarial signers are unable to determine the interaction that created tokens. Suppose an adversarial signer has interacted with users K times, and then receives one of the resulting signatures at random. Then, the adversarial signer cannot determine the interaction resulting in the challenge signature with probability better than random guess of 1/K.

Some embodiments use blind decryption for the control plane, in order to validate the authenticity of the token sets, without gaining knowledge of the software artifact or device's identity. As an aside, blind decryption is a technique by which an agent can provide a service to (i.e., compute a function for) a client in an encoded form without knowing either the real input or the real output. A blind decryption scheme can be a public-key encryption (PKE) scheme that admits a protocol for obliviously decrypting ciphertexts. In this protocol, a User who possesses a ciphertext interacts with a Decryptor who holds the necessary secret key. At the conclusion of the protocol, the User obtains the plaintext while the Decryptor learns nothing about what it decrypted. More precisely, Alice has an input x and Oscar has a function $f$. Alice would like Oscar to compute $y=f(x)$ for her without revealing either x or y to him. The reason for her wanting this might be that she doesn't know the function $f$, or that she does not have the resources to compute it. Alice therefore can "blind" the message by encoding it into some other input $E(x)$, in some embodiments. The encoding E can be a bijection on the input space of $f$, in some embodiments. The encoding E can be a Rivest-Shamir-Adleman (RSA) encryption, in some embodiments. Oscar gives her $f(E(x))$, to which she can apply a decoding D to obtain $D(f(E(x)))=y$.

Anonymous establishment of a trusted unique identity can be utilized for many use cases, depending on the embodiment, including but not limited to the following examples. As a first example, it can be utilized for privacy preserving licensing, where no unique user/software artifact/device identity is required but cloning and reuse must be prevented. In other words, the control plane only cares whether the software artifact or the device are unique and valid, in order to prevent cloning attacks and malicious reuse of the license in violation of the license terms of use. The software artifact or device's unique identity, despite being typically used for licensing in existing technologies, can thus be hidden from the control plane, allowing full anonymity and privacy preservation of devices and of end users from the licensing control plane.

As a second example, anonymous establishment of a trusted unique identity can be utilized for support of Service Provider Multi-Tenancy, where a service provider provides a solution to a customer, and the customer then provides a multi-tenant solution to the customer's customers. The customer's customers often are then required to establish a trusted identity with the service provider, while wishing to preserve their anonymity from Dell due to privacy concerns, including privacy regulations such as the General Data Protection Regulation (GDPR). For example, a storage system provides storage to a service provider, the service provider then provides a storage solution to end users. The end users require support from the storage system backend, for instance, without providing identifying information, rather only proving that they are valid end users.

As a third example, anonymous establishment of a trusted unique identity can be utilized for support compliance with privacy regulations such as the GDPR, where services can be provided by a data processor to legitimate customers without being exposed to any personal identifying information (PII).

As a fourth example, anonymous establishment of a trusted unique identity can be utilized for control plane provisioning of a secure identity to edge devices on behalf of customers, where the edge device's identity should remain anonymous, and the only knowledge exposed to the control plane is whether the device is a valid edge device.

As a fifth example, anonymous establishment of a trusted unique identity can be utilized for control plane support of virtual devices and software artifacts deployed in the public cloud, since there is no reliance on a serialized shared secret key or trusted-key pair protected by a hardware, firmware or Trusted Computing Base (TCB). Thus, a control plane can establish trust in remote virtual devices and software devices deployed in the public cloud, and not physically serialized or owned, with no hardware root-of-trust, in order to establish a secure, tamper proof and non-cloneable identity. This establishment of trust can be performed while preserving the virtual devices anonymity, thus enabling support of secure multi-tenancy provided by service providers on the public cloud, with anonymity of the tenants.

Figure 4:
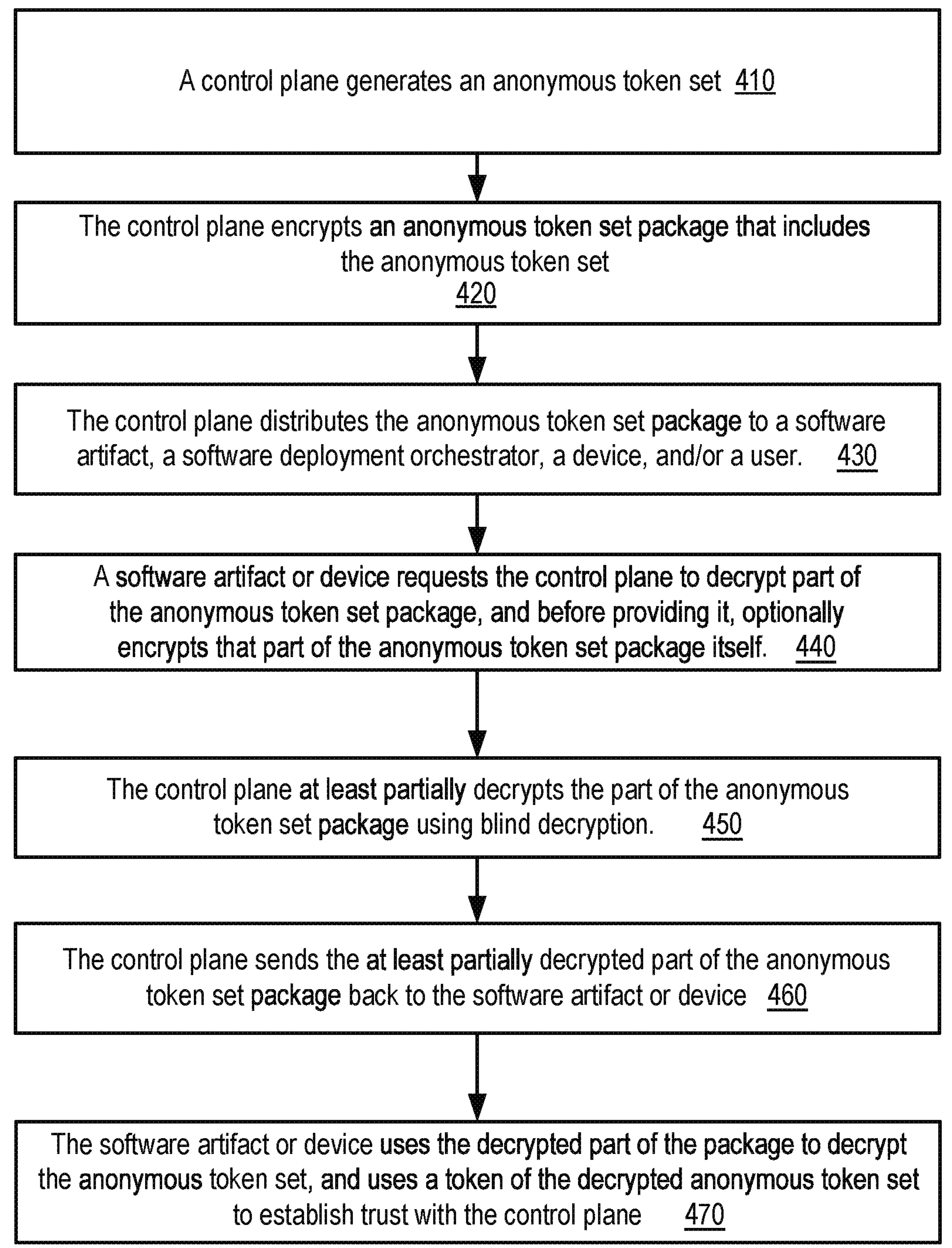
FIG. 4 is a flowchart illustrating an example of a method for a control plane to cryptographically trust anonymous software artifacts or devices, according to some embodiments.

Embodiments of Methods for Cryptographically Trusting Software Artifacts or Devices FIG. 4 is a flowchart illustrating an example of a method for a control plane (e.g., control plane 210 or VCS control plane 310) to cryptographically trust anonymous software artifacts or devices, according to some embodiments. In some embodiments, the method may be performed, at least in part, by operation of systems through the execution of program instructions stored in system memory 103 and executed by host processor(s) 101 of IHS 100.

The establishment of software artifact trust while preserving anonymity can be based on the use of anonymous tokens, in some embodiments. These tokens can created by the control plane and can be distributed anonymously, following encryption, to software artifacts. Therefore, FIG. 4 begins with block 410 where a control plane generates an anonymous token set. The flowchart transitions to block 420 where the control plane encrypts an anonymous token set package that includes the anonymous token set.

The flowchart then transitions to 430 where the control plane distributes the anonymous token set package to a software artifact, a software deployment orchestrator, a device, and/or a user. The anonymous tokens can be distributed as a set to a user or software deployment orchestrator, who can then distribute a single anonymous token to each deployed software artifact.

However, these encrypted tokens cannot be used by the software artifact until they are first sent to the control plane for decryption. Thus, at block 440, a software artifact or device requests the control plane to decrypt part of the anonymous token set package. Before providing it, the software artifact or device optionally encrypts that part of the anonymous token set package itself. Therefore, when the control plane decrypts encrypts that part of the anonymous token set package, it will still be encrypted by the software artifact or device. Then, the control plane at least partially decrypts the part of the anonymous token set package using blind decryption at 450, according to some embodiments. The control plane decryption of the encrypted anonymous tokens can use blind decryption, which does not expose the token's unique identifier to the control plane during the decryption process. In embodiments where blind decryption is used, the part of the anonymous token set package, even though decrypted by the control plane, is still encrypted by the software artifact or device, thereby not allowing the control plane to view its contents.

The flowchart transitions to 460 where the control plane sends the at least partially decrypted part of the anonymous token set package back to the software artifact or device. The at least partially decrypted part of the anonymous token set package can be fully decrypted if blind decryption is not being used, according to some embodiments, or the at least partially decrypted part of the anonymous token set package can still be encrypted using a key of the software artifact or device, if blind decryption is being used, according to some embodiments. If blind decryption is being used, then the software artifact or device, after receiving the partially decrypted part of the anonymous token set package, will need to first decrypt it further using its own key, before the plaintext can be used.

Following their decryption into plaintext, the decrypted tokens can be used by the software artifact, to establish trust with the control plane anonymously, as described in detail below. Thus, at block 470, the software artifact or device uses the decrypted part of the package to decrypt the anonymous token set, and uses a token of the decrypted anonymous token set to establish trust with the control plane, according to some embodiments. The establishment of anonymous trust has many applications, including the provisioning by the control plane to the software artifact of a software license, while preserving the software artifact's anonymity. A distinction can be made between the Control Plane and another party that manages the tokens, which can called the "System Owner". However, the Control Plane and the System Owner can collaborate, or be the same entity, without causing a breach in privacy, depending on the embodiment.

Figure 5:
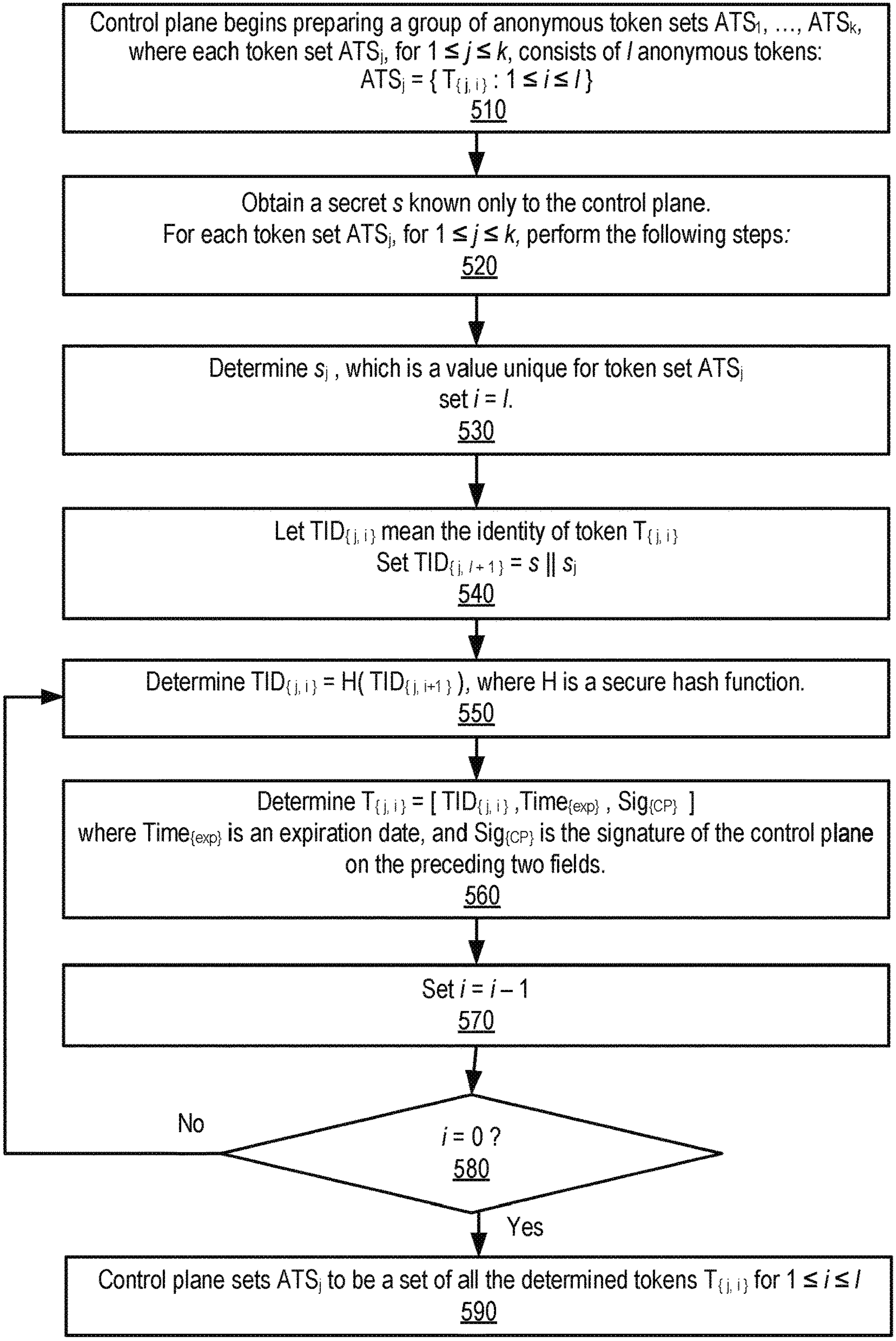
FIG. 5 is a flowchart illustrating an example of a method for a control plane to prepare a group of anonymous token sets, in order to cryptographically trust anonymous software artifacts or devices, according to some embodiments.

FIG. 5 is a flowchart illustrating an example of a method for a control plane to prepare a group of anonymous token sets, in order to cryptographically trust anonymous software artifacts or devices, according to some embodiments. In some embodiments, the method may be performed, at least in part, by operation of systems through the execution of program instructions stored in system memory 103 and executed by host processor(s) 101 of IHS 100.

The flowchart begins at 510 where the control plane begins preparing a group of anonymous token sets $ATS_1, \ldots, ATS_k$, where each token set $ATS_j$, for $1 \le j \le k$, consists of l anonymous tokens. Therefore, an anonymous token set $ATS_j$ includes $\{T_{\{j,i\}}: 1 \le i \le l\}$. The token sets can be provided to a software artifact or a third-party software deployment orchestrator. The token set can include a single token for the use case of deployment of only a single software artifact. However, the generation of multiple anonymous tokens in a set is described here, for the sake of generality.

Then at block 520 the control plane obtains a secret s known only to the control plane. Block 520 also notes that the remaining blocks, blocks 530 to 590 are performed iteratively for each token set $ATS_j$, for $1 \le j \le k$. Therefore the entirety of blocks 530 to 590 will be performed in a look a total of k times.

The flowchart then transitions to block 530 which determines $s_j$, which is a value unique for token set $ATS_j$. The flowchart sets the internal variable i to be equal to l, where l is the number of anonymous tokens in each token set. The flowchart then transitions to block 540, where $TID_{\{j,l\}}$ is defined to mean the identity of token $T_{\{j,l\}}$. The block also sets an internal variable $TID_{\{j,l+\}}$, which is not actually part of the distributed anonymous token set, to s concatenate with $s_j$.

The flowchart then transitions to block 550 which begins a loop corresponding to each token of the anonymous token set $ATS_j$. This loop begins at block 550 and ends at block 580. The 550 to 580 loop is thereby computed for each token of the anonymous token set $ATS_j$, until (at 580) the internal variable i is equal to 0, in which case the flowchart then moves on to 590.

Block 550 is the first step of the loop, and it determines the token identifier $TID_{\{j,i\}}=H(TID_{\{j,i+1\}})$, where H is a secure hash function. The very first time through the loop, the internal variable i to be equal to l, where l is the number of anonymous tokens in each token set. Thus, during this first iteration, $TID_{\{j,l\}}=H(TID_{\{j,l+1\}})$. $TID_{\{j,l+1\}}$ was actually determined previously in step 540. That determination of $TID_{\{j,l+1\}}$ is now used in the first iteration of this look.

Then at 560 the token itself $T_{\{j,i\}}$ is determined by $T_{\{j,i\}}=[TID_{\{j,i\}}, Time_{\{exp\}}, Sig_{\{CP\}}]$ where $Time_{\{exp\}}$ is an expiration date, and $Sig_{\{CP\}}$ is the signature of the control plane on the preceding two fields. The flowchart then transitions to block 570 which sets the internal variable i to be equal to i−1.

The flowchart then transitions to block 580. Block 580 completes the loop with block 550. At block 580, if the internal variable i is equal to 0, then all tokens have been calculated, and therefore the flowchart moves on to 590. If, however, the internal variable i is not equal to 0, then the flowchart returns to 550 for the same calculations to be computed for the next token of the total number of tokens in $ATS_j$. Finally, at 590, the control plane sets the anonymous token set $ATS_j$ to be a set of all the determined tokens $T_{\{j,i\}}$ for $1 \le i \le l$.

Figure 6:
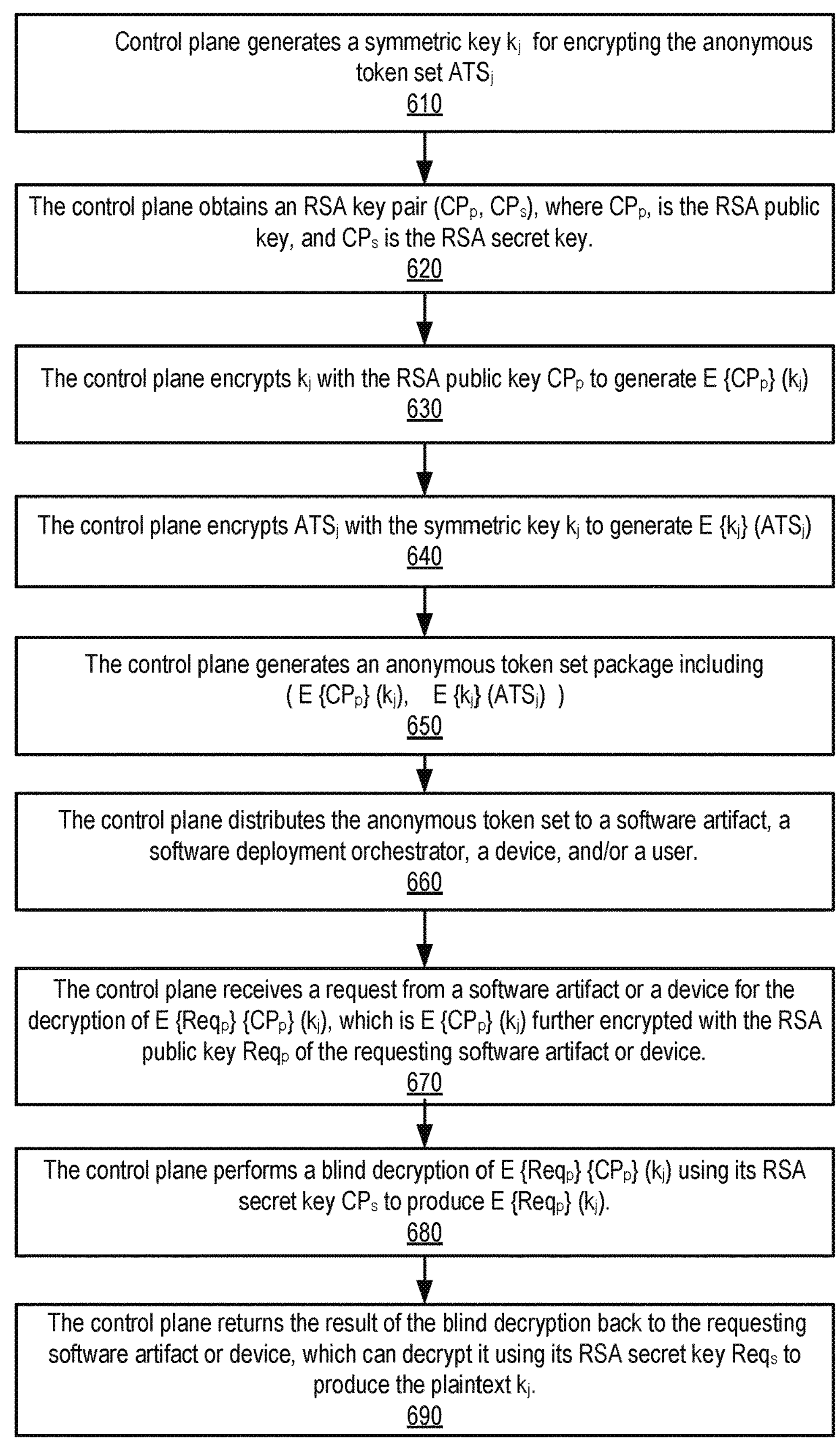
FIG. 6 is a flowchart illustrating an example of a method for a control plane to generate an anonymous token set package, distribute the anonymous token set package, receive a request from a software artifact or device for decryption of a part of the anonymous token set package, and to perform blind decryption on the part of the anonymous token set package, in order to cryptographically trust anonymous software artifacts or devices, according to some embodiments.

FIG. 6 is a flowchart illustrating an example of a method for a control plane to generate an anonymous token set package, distribute the anonymous token set package, receive a request from a software artifact or device for decryption of a part of the anonymous token set package, and to perform blind decryption on the part of the anonymous token set package, in order to cryptographically trust anonymous software artifacts or devices, according to some embodiments. In some embodiments, the method may be performed, at least in part, by operation of systems through the execution of program instructions stored in system memory 103 and executed by host processor(s) 101 of IHS 100.

The flowchart begins at block 610, where the control plane generates a symmetric key $k_j$ for encrypting the anonymous token set $ATS_j$. Either before or after 610, the control plane, at 620, obtains a Rivest-Shamir-Adleman (RSA) key pair ($CP_p$, $CP_s$), where $CP_p$, is the RSA public key, and $CP_s$ is the RSA secret key. RSA is a public-key cryptosystem, where the encryption key is public and distinct from the decryption key, which is kept secret (private). An RSA user creates and publishes a public key based on two large prime numbers, along with an auxiliary value. The prime numbers are kept secret. Messages can be encrypted by anyone, via the public key, but can only be decoded by an entity who knows the private key. Conversely, messages can be signed by the private key, and then any entity with the public key can verify that the message was encrypted by an entity who knows the private key.

At 630, the control plane encrypts the generated symmetric key $k_j$ with the RSA public key $CP_p$ to generate $E_{\{CP\}(k_j)}$. Then, at 640, the control plane encrypts $ATS_j$ with the symmetric key $k_j$ to generate $E\{k_j\}(ATS_j)$. Using these two encryptions, the control plane generates an anonymous token set package, including: $(E_{\{CP\}(k_j)}, E_{\{k_j\}(ATS_j)})$ at block 650. Then, at block 660, control plane distributes the anonymous token set to a software artifact, a software deployment orchestrator, a device, and/or a user. As long as the first component $E_{\{CP\}(k_j)}$ remains encrypted, the deployer of the software artifacts cannot make use of the tokens in the package, in some embodiments.

A software deployment orchestrator that wishes to establish control plane trust for its deployed software artifacts, needs first to acquire an anonymous token set, in some embodiments. That transaction takes place separately and can be performed anonymously, assuming an anonymous networking scheme is used. In some embodiments, it is not required to authenticate the software deployment orchestrator or the software artifact/device, at this stage. After acquiring the token, the software deployment orchestrator will be identified by the control plane only by the index j.

Since the tokens remain encrypted with $k_j$, they cannot yet be used by the software artifact. In order to use the anonymous token set package, software artifact A requests from the control plane the decryption of $E_{\{CP_p\}(k_j)}$ at block 670. In some embodiments, before sending the request to decrypt the encrypted symmetric key $E_{\{CP_p\}(k_j)}$ to the control plane, the requestor encrypts the control plane's encrypted symmetric secret key with the requestor's own RSA public key $Req_p$—causing the secret to be double encrypted before sending it to the control plane. Thus, the encrypted symmetric key becomes $E_{\{Req_p\}\{CP_p\}(k_j)}$. This is what enables blind decryption, in these embodiments. Even once the control plane has decrypted the secret, it remains encrypted with the requestor's own RSA public key (as $E_{\{Req_p\}(k_j)}$), and thus unreadable to the control plane, since the requestor's RSA secret (or private) key $Req_s$ is needed to decrypt it. In other words, the control plane cannot read the secret $E_{\{Req_p\}(k_j)}$ in order to link it to the requestor it previously distributed it to.

The control plane receives such a request. The control plane, at 680, performs a blind decryption of $E_{\{CP_p\}(k_j)}$ or $E_{\{Req_p\}\{CPp\}(k_j)}$ using its RSA secret key $CP_s$. This can be performed using blind decryption. In some embodiments, this process is done separately from the procedure for acquiring the anonymous token set package, so that the two transactions cannot be linked. Due to the blind decryption, the control plane does not learn the value of $k_j$ and thus the token sets remain anonymous despite the fact that the control plane authenticates the software artifact. The flowchart finishes at block 690, where the control plane returns the result of the blind decryption back to the requesting software artifact or device. The result of the blind decryption can be $E_{\{Req_p\}(k_j)}$, in some embodiments. In some embodiments, the requestor might need to further decrypt $E_{\{Req_p\}(k_j)}$with its own secret key $Req_s$ to produce the decrypted $k_j$. The requestor then receives the still encrypted secret $E_{\{Req_p\}(k_j)}$ from the control plane, and decrypts it with the requestor's own RSA private key $Req_s$. Thus, the secret only becomes cleartext at this point, where the cleartext is the unencrypted symmetric key $k_j$.

The now decrypted token sets can be used by software artifact/device A in order to establish trust with the control plane. The control plane can verify that each token is used only once, thus preventing reuse and possible trust-cloning. (This can be used to prevent license cloning)

Figure 7:
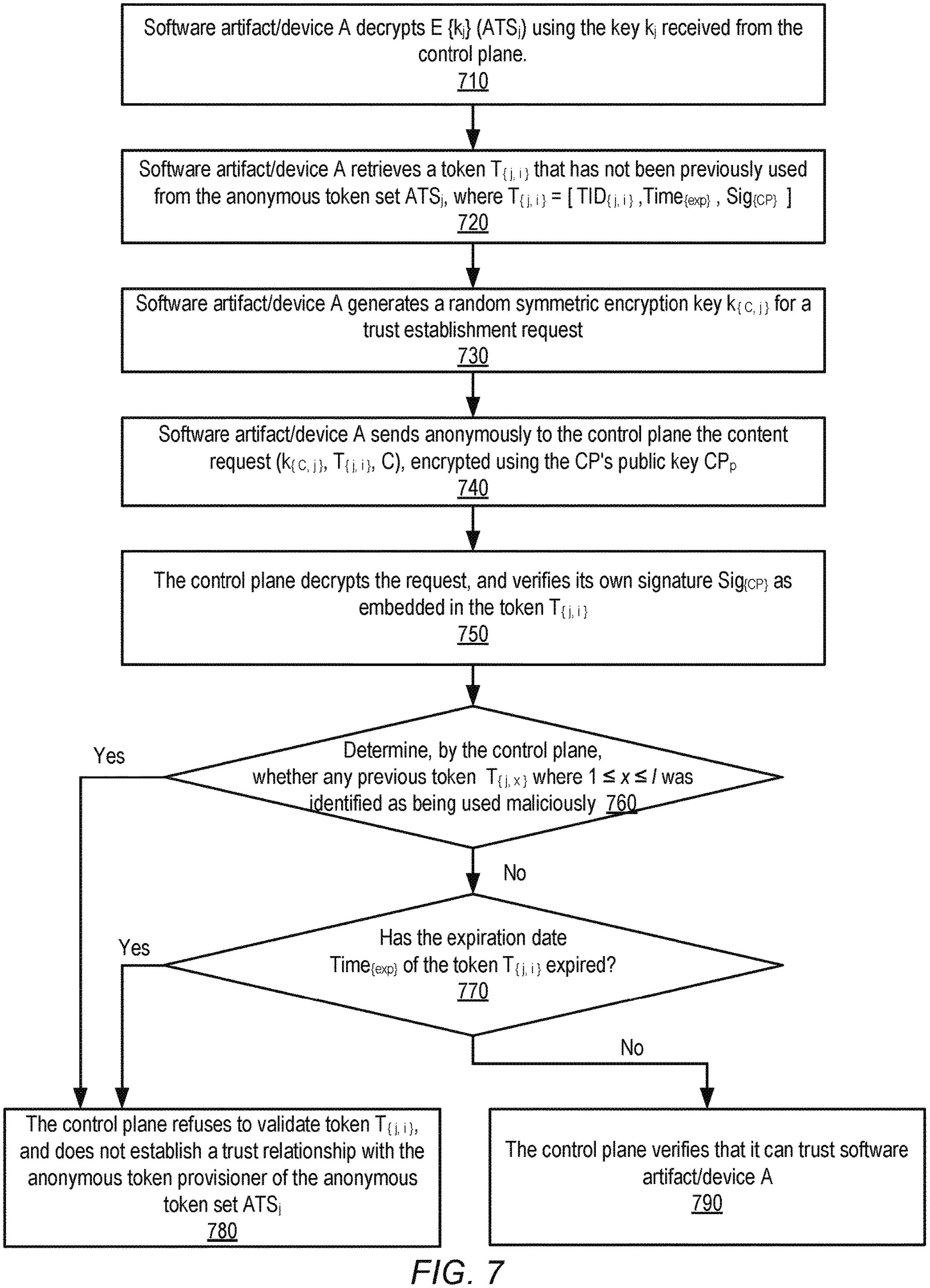
FIG. 7 is a flowchart illustrating an example of a method for a software artifact or device to establish trust with a control plane using an anonymous token, and the control plane determining whether it can establish trust with the software artifact or device, according to some embodiments.

FIG. 7 is a flowchart illustrating an example of a method for a software artifact or device to establish trust with a control plane using an anonymous token, and the control plane determining whether it can establish trust with the software artifact or device, according to some embodiments. In some embodiments, the method may be performed, at least in part, by operation of systems through the execution of program instructions stored in system memory 103 and executed by host processor(s) 101 of IHS 100. The method of FIG. 7 does not rely on a trusted third party, and it can be used in both two-party and multi-party software deployment systems, in some embodiments.

The flowchart begins at 710, where a software artifact and/or device A decrypts $E\{k_j\}(ATS_j)$ using the key $k_j$ received from the control plane. The flowchart transitions to 720 where the software artifact/device A retrieves a token $T_{\{j,i\}}$ that has not been previously used from the anonymous token set $ATS_j$, where $T_{\{j,i\}}=[TID_{\{j,i\}}, Time_{\{exp\}}, Sig_{\{CP\}}]$.

At 730, the software artifact/device A generates a random symmetric encryption key $k_{\{C,j\}}$ for a trust establishment request. Then at 740, the software artifact/device A sends anonymously to the control plane the content request ($k_{\{C,j\}}$, $T_{\{j,i\}}$, C), encrypted using the control plane's public key $CP_p$. In the request, $T_{\{j,i\}}$ is one of the l tokens in the token set $ATS_j$ that was not used so far by A (or by the software deployment orchestrator that deployed A). After the control plane receives the request, the control plane decrypts the request, and verifies its own signature $Sig_{\{CP\}}$ as embedded in the token $T_{\{j,i\}}$ at block 750.

The control plane then determines whether any previous token $T_{\{j,x\}}$ where $1 \le x \le l$ was ever identified as being used maliciously. If a previous token $T_{\{j,x\}}$ was identified as having been used maliciously, then the flowchart transitions to block 780. If no previous token $T_{\{j,x\}}$ where $1 \le x \le l$ was ever identified as being used maliciously, then the flowchart transitions to block 770. At block 770, the control plane determines if the expiration date $Time_{\{exp\}}$ of the token $T_{\{j,l\}}$ has expired. If the expiration date has expired, the flowchart transitions to block 780. At block 780, the control plane refuses to validate token $T_{\{j,l\}}$, and does not establish a trust relationship with the anonymous token provisioner of the anonymous token set $ATS_j$. However, if the expiration date has not expired at 770, then the flowchart transitions to block 790, where the control plane verifies that it can trust software artifact/device A, and so establishes a trust relationship with the software artifact/device A.

Following the establishment of trust by the control plane in software artifact/device A, additional actions can be performed by the control plane to maintain this trust, such as sending software artifact/device A a single use software license, for example.

Embodiments of Methods for Cryptographically Revoking the Trust of Software Artifacts or Devices This section describes embodiments for the revocation by the control plane of trust previously established using a cryptographically verifiable anonymized token provided by a software artifact or device, in order to revoke trust in the generic software artifacts/devices. Some embodiments can further either revoke the control-plane managed anonymized identity, or suspend providing services and communications. This revocation can be performed while supporting the full anonymity of the software artifact/device and its end user, in some embodiments.

The control plane uses, in some embodiments, a cryptographically verifiable anonymized token provided by a software artefact or device, to establish a trust in the software artifact. The software artifact's or device's identity does not need to be known to the control plane, and thus the software artifact's privacy can be preserved. The anonymous token is verifiable and unique and supports a method of enforcing single usage. This allows utilization of the anonymized token to establish the initial trust between the control plane and the software artifact. The verified trust can be used either to provision a control plane anonymized managed secure identity at runtime, or to establish trust in order to provide services, in some embodiments. One use case can be for privacy preserving licensing, where no unique identity is required, however license cloning and reuse must be prevented.

Some embodiments provide a method for revoking the control plane's trust in the software artifact or device, when malicious usage either by the software artifact or device, or by the deployment provisioner of the software artifact or device, is identified by the control plane. The previously established trust can be revoked for the anonymous software artifact/device or for a collection of software artifact/s devices all deployed/owned by a single deployment provisioner. This can enable software license revocation, and/or the control plane suspending services, and/or communication either to the single software artifact/device, or to the collection of software artifact/s devices, all deployed/owned by a single deployment provisioner.

Some embodiments of the present disclosure provide for the revocation of previously established trust, which was established between a control plane and a software artifact, without requiring the knowledge of a unique identity, while preserving the software artifact's anonymity. Some embodiments do not have any requirement for control plane knowledge of the identity of the account being revoked. This can be typically required using a unique cryptographic identity such as a pre-serialized secret symmetric key protected within a TPM, or a certificate and public-private key-pair signed by a Certificate Authority with a shared root-of-trust, which are then compared against Certificate Revocation Lists (CRL) or using Online Certificate Status Protocol (OCSP).

In some embodiments, license usage by malicious users can be revoked, without requiring control plane knowledge of a software artifact's identity, thus preserving anonymity. In some embodiments, anonymous flagging of suspicious software artifacts, and anonymous revocation, can allow data processors responsible for protecting these systems to revoke these suspicious or malicious licenses while preserving the privacy of the end user. This can enable data processors to perform revocation of users/account when identified by anti-piracy systems, such as Intrusion Detection Systems, without concerns about compliance with privacy regulations such as the GDPR. For example, there can be scenarios where anti-piracy actions taken by data processors to flag suspected malicious users are forbidden under privacy regulations such as GDPR.

Some embodiments of the present disclosure provide support for revocation of virtual devices and software artifacts deployed in the public cloud. Since some embodiments have no reliance on a serialized shared secret key or trusted-key pair protected by a hardware, firmware or Trusted Computing Base (TCB), a control plane can control and revoke trust in remote virtual devices and software devices deployed in the public cloud and not physically serialized or owned, with no Hardware Root of Trust. This monitoring of public cloud virtual devices, along with control of these virtual devices, and revocation of trust, can be performed while preserving the virtual devices' anonymity. Thus, this can enable support of control plane monitoring and control of secure multi-tenancy provided by service providers on the public cloud, with anonymity of the tenants, in some embodiments.

Figure 8:
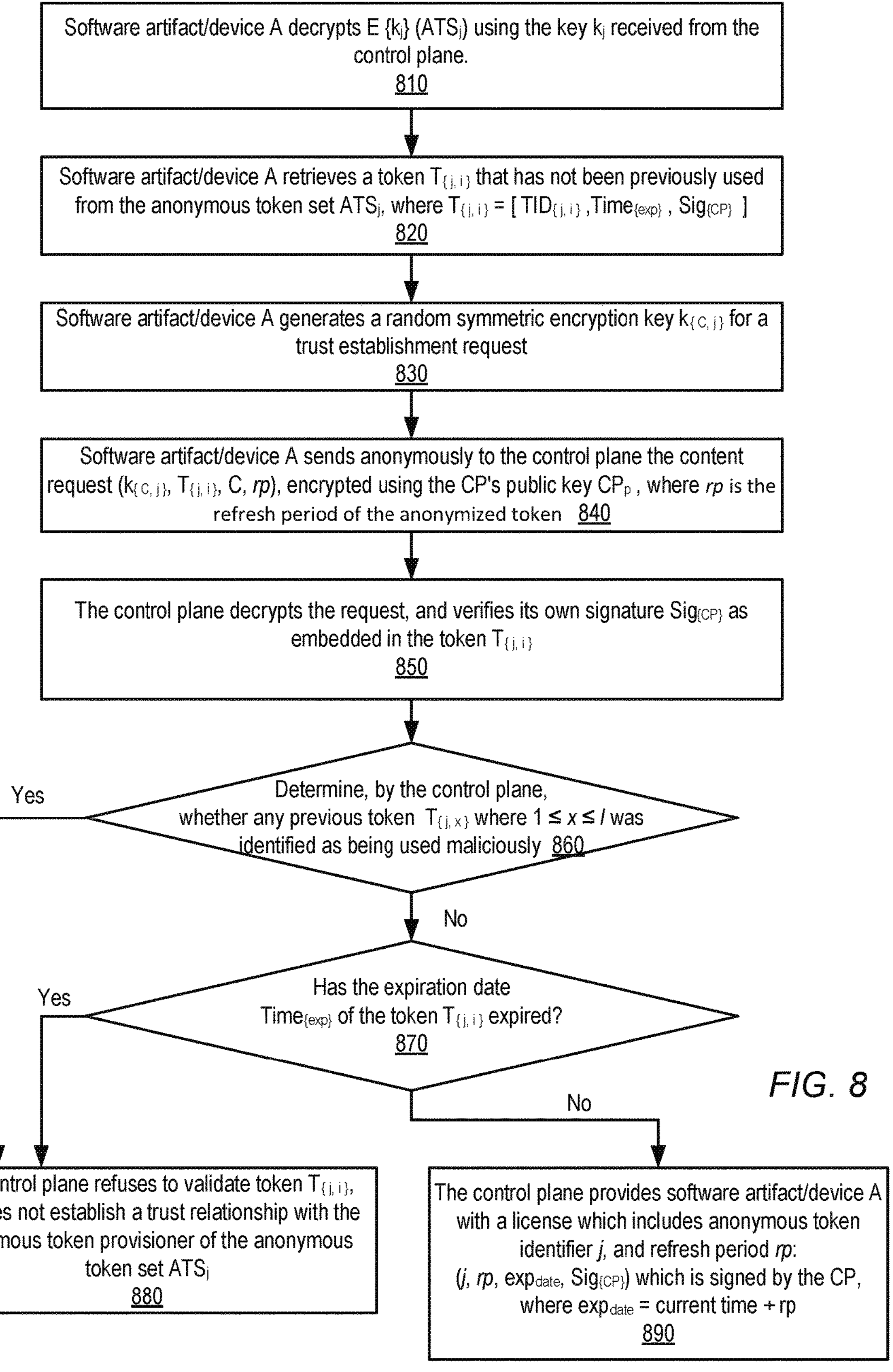
FIG. 8 is a flowchart illustrating an example of a method for a software artifact or device to initially establish trust with a control plane using an anonymous token and a refresh period, and the control plane determining whether it can establish trust with the software artifact or device, and if so, sending the software artifact or device a license with a refresh period, according to some embodiments.
Figure 9:
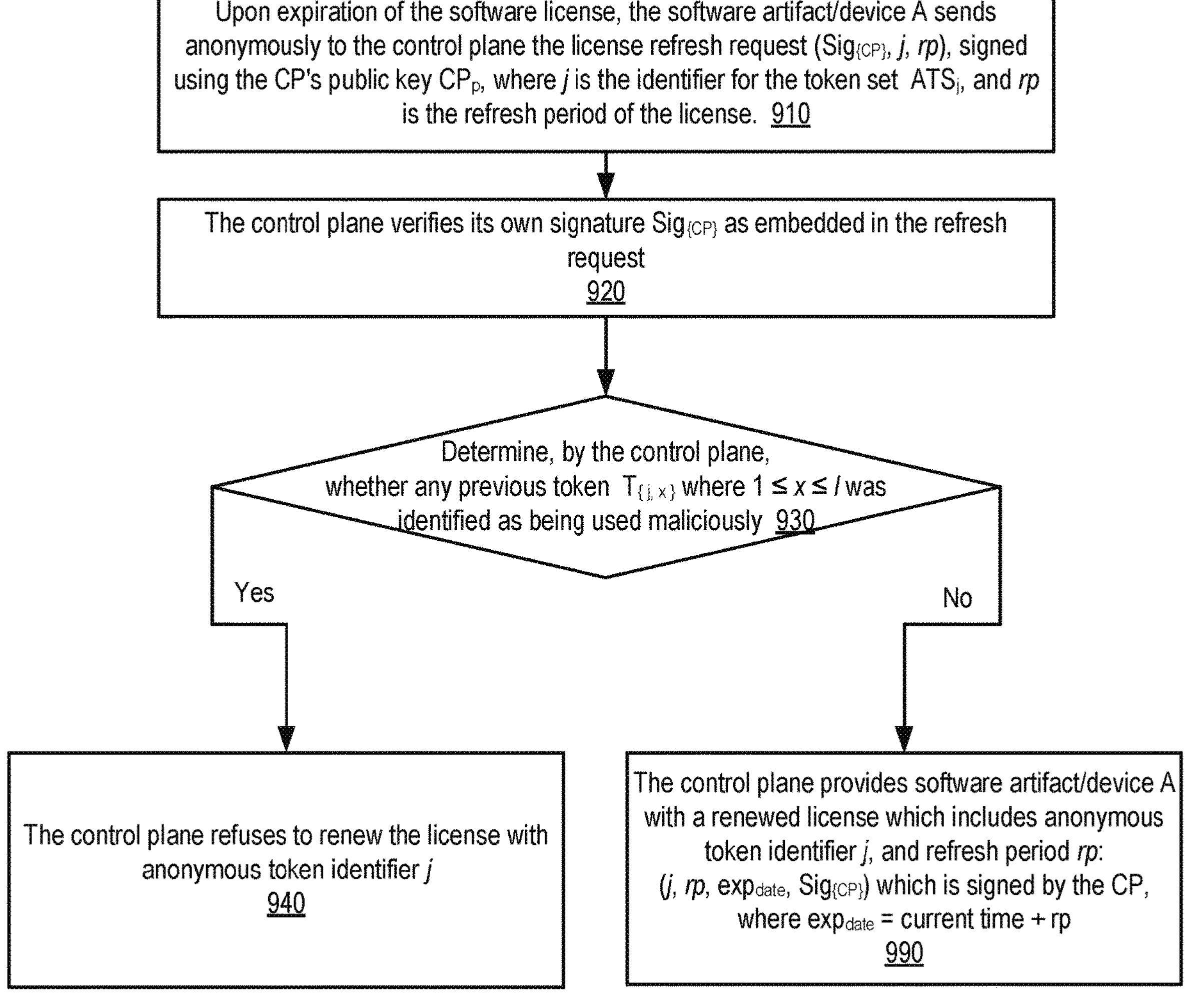
FIG. 9 is a flowchart illustrating an example of a method for periodic re-establishment of anonymized trust and support for revocation, according to some embodiments.

FIGS. 8 and 9 describe methods for validating that anonymous tokens do not belong to a revoked set of tokens. Some embodiments revoke usage of tokens which do belong to a revoked set of tokens. Different embodiments employ different methods of establishing whether a software artifact is acting in a malicious manner, as well as employing different decision logic to revoke an anonymous token set.

In some embodiments, control plane revocation of trust in anonymous software artifacts/devices can be expanded to post-deployment validation. Such embodiments can set a short refresh period for anonymous tokens, and potentially set the same refresh period for the established trust, by using licenses with a corresponding required refresh date. In some embodiments, the decrypted token sets that can be used by software artifact/device A in order to establish trust with the control plane, contain a short lived refresh time period. During the trust establishment process, the control plane can verify that the token belongs to a token set that is not revoked, and provide a short lived license which shall require refreshing following the time period. This can enable the control plane to frequently check that the previously established trust should not be revoked, in these embodiments.

FIG. 8 is a flowchart illustrating an example of a method for a software artifact or device to initially establish trust with a control plane using an anonymous token and a refresh period, and the control plane determining whether it can establish trust with the software artifact or device, and if so, sending the software artifact or device a license with a refresh period, according to some embodiments. In some embodiments, the method may be performed, at least in part, by operation of systems through the execution of program instructions stored in system memory 103 and executed by host processor(s) 101 of IHS 100. The method of FIG. 8 does not rely on a trusted third party, and it can be used in both two-party and multi-party software deployment systems, in some embodiments.

The flowchart begins at 810, where a software artifact and/or device A decrypts $E\{k_j\}(ATS_j)$ using the key $k_j$ received from the control plane. The flowchart transitions to 820 where the software artifact/device A retrieves a token $T_{\{j,i\}}$ that has not been previously used from the anonymous token set $ATS_j$, where $T_{\{j,i\}}=[TID_{\{j,i\}}, Time_{\{exp\}}, Sig_{\{CP\}}]$.

At 830, the software artifact/device A generates a random symmetric encryption key $k_{\{C,j\}}$ for a trust establishment request. Then at 840, the software artifact/device A sends anonymously to the control plane the content request ($k_{\{C,j\}}$, $T_{\{j,i\}}$, C, rp), encrypted using the control plane's public key $CP_p$, where rp is the refresh period of the anonymized token. In the request, $T_{\{j,i\}}$ is one of the l tokens in the token set $ATS_j$ that was not used so far by A (or by the software deployment orchestrator that deployed A). After the control plane receives the request, the control plane decrypts the request, and verifies its own signature $Sig_{\{CP\}}$ as embedded in the token $T_{\{j,i\}}$ at block 850.

The control plane then determines whether any previous token $T_{\{j,x\}}$ where $1 \le x \le l$ was ever identified as being used maliciously. If a previous token $T_{\{j,x\}}$ was identified as having been used maliciously, then the flowchart transitions to block 880. If no previous token $T_{\{j,x\}}$ where $1 \le x \le l$ was ever identified as being used maliciously, then the flowchart transitions to block 870. At block 870, the control plane determines if the expiration date $Time_{\{exp\}}$ of the token $T_{\{j,l\}}$ has expired. If the expiration date has expired, the flowchart transitions to block 880. At block 880, the control plane refuses to validate token $T_{\{j,l\}}$, and does not establish a trust relationship with the anonymous token provisioner of the anonymous token set $ATS_j$. However, if the expiration date has not expired at 870, then the flowchart transitions to block 890, where the control plane provides software artifact/device A with a license which includes anonymous token identifier j, and refresh period rp: (j, rp, $exp_{date}$, $Sig_{\{CP\}}$) which is signed by the control plane, where $exp_{date}$=current time+rp. Therefore, at block 890 the control plane establishes a trust relationship with the software artifact/device A.

FIG. 9 is a flowchart illustrating an example of a method for periodic re-establishment of anonymized trust and support for revocation, according to some embodiments. In some embodiments, the method may be performed, at least in part, by operation of systems through the execution of program instructions stored in system memory 103 and executed by host processor(s) 101 of IHS 100.

The flowchart begins at 910, where upon expiration of the software license, the software artifact/device A sends anonymously to the control plane a license refresh request ($Sig_{\{CP\}}$, j, rp), signed using the control plane's public key $CP_p$, where j is the identifier for the token set $ATS_j$, and rp is the refresh period of the license. Therefore, the request does not include an actual token of the token set $ATS_j$, but instead includes an identifier of the token set. The flowchart then transitions to 920, in which the control plane verifies its own signature $Sig_{\{CP\}}$ as embedded in the refresh request.

At 930, the control plane determines whether any previous token $T_{\{j,x\}}$ where $1 \le x \le l$ was identified as being used maliciously. If any previous token $T_{\{j,x\}}$ was used maliciously, the flowchart transitions to block 940, where the control plane refuses to renew the license with anonymous token identifier j. If no previous token $T_{\{j,x\}}$ (where $1 \le x \le l$) was used maliciously, then the flowchart transitions to block 990. At 990, the control plane provides software artifact/device A with a renewed license which includes anonymous token identifier j, and refresh period rp: (j, rp, $exp_{date}$, $Sig_{\{CP\}}$) which is signed by the control plane, where $exp_{date}$=current time+rp. Therefore, at block 990 the control plane continues the previously established trust relationship with the software artifact/device A.

Different embodiments can provide for different options than the details of the figures above. For example, some embodiments provide support for re-provisioning of software artifacts/devices which were disconnected from the control plane and require re-establishment of trust without requiring provisioning of a new anonymous token. In addition, support for usage of other asymmetric encryption algorithms such as Diffie-Hellman, removing the reliance on RSA for performing blind decryption, can be provided by some embodiments.

CONCLUSION

To implement various operations described herein, computer program code (i.e., program instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks.

Program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the operations specified in the block diagram block or blocks.

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices.

Similarly, operational data may be identified and illustrated herein within modules and may be embodied in any suitable form and organized within any suitable type of data structure. Operational data may be collected as a single data set or may be distributed over different locations including over different storage devices.

Reference is made herein to "configuring" a device or a device "configured to" perform some operation(s). This may include selecting predefined logic blocks and logically associating them. It may also include programming computer software-based logic of a retrofit control device, wiring discrete hardware components, or a combination of thereof. Such configured devices are physically designed to perform the specified operation(s).

Various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs.

As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:

a processor; and a memory coupled to the processor, wherein the memory comprises program instructions stored thereon that, upon execution by the processor, cause a control plane of the IHS to:

receive, from a requesting entity, a request to decrypt a part of a distributed anonymous token set package, wherein the distributed anonymous token set package comprises an anonymous token set comprising a plurality of anonymous tokens, including the anonymous token;

at least partially decrypt, by the control plane, the part of the distributed anonymous token set package based at least in part on blind decryption, wherein the blind decryption does not allow the control plane to view contents of the part;

send the at least partially decrypted part of the distributed anonymous token set package to the requesting entity;

establish a trust relationship with the requesting entity based, at least in part, on a received anonymous token of the distributed anonymous token set package, wherein the requesting entity obtained the received anonymous token by decryption of an anonymous token set of the distributed anonymous token set package based at least in part on the at least partially decrypted part, and wherein to establish the trust relationship with the requesting entity, the program instructions further cause the control plane of the IHS to: provide a license to the requesting entity, wherein the license comprises an identifier of the anonymous token set, information in regard to an expiration date or time, a refresh period, and a signature of the control plane;

receive a second request from the requesting entity, wherein the second request further comprises a refresh request for the license, and wherein the refresh request comprises the identifier of the anonymous token set, the refresh period, and a signature based at least in part on a public key of the control plane; and subsequent to the second request, determine to revoke the trust relationship with the requesting entity.

2. The IHS of claim 1, wherein the requesting entity comprises a software artifact or a device of a system comprising the IHS.

3. The IHS of claim 1, wherein the second request comprises a second anonymous token of the distributed anonymous token set package.

4. The IHS of claim 1, wherein the distributed anonymous token set package comprises an anonymous token set comprising a plurality of anonymous tokens, including the anonymous token, wherein the second request comprises an identifier of the anonymous token set of the distributed anonymous token set package, and wherein the second request does not comprise any of the plurality of anonymous tokens of the distributed anonymous token set package.

5. A method, comprising:

receiving, by a control plane of a system, a request from a requesting entity to decrypt a part of a distributed anonymous token set package, wherein the distributed anonymous token set package comprises an anonymous token set comprising a plurality of anonymous tokens, including the anonymous token;

at least partially decrypting, by the control plane, the part of the distributed anonymous token set package using blind decryption, wherein the blind decryption does not allow the control plane to view contents of the part;

sending, by the control plane, the at least partially decrypted part of the distributed anonymous token set package to the requesting entity;

establishing, by the control plane, a trust relationship with the requesting entity based, at least in part, on a received anonymous token of the distributed anonymous token set package, wherein the requesting entity obtains the received anonymous token by decrypting an anonymous token set of the distributed anonymous token set package using the at least partially decrypted part, and wherein to establish the trust relationship with the requesting entity, the control plane provides a license to the requesting entity, wherein the license comprises an identifier of the anonymous token set, information regarding an expiration date or time, a refresh period, and a signature of the control plane;

receiving, by the control plane, a second request from the requesting entity, wherein the second request further comprises a refresh request for the license, and wherein the refresh request comprises the identifier of the anonymous token set, the refresh period, and a signature using a public key of the control plane; and subsequent to receiving the second request, determining, by the control plane, to revoke the trust relationship with the requesting entity.

6. The method of claim 5, further comprising:

revoking, by the control plane, the trust relationship with the requesting entity.

7. The method of claim 5, wherein the requesting entity comprises a software artifact or a device of the system.

8. The method of claim 5, wherein the second request comprises a second anonymous token of the distributed anonymous token set package.

9. The method of claim 5, wherein the distributed anonymous token set package comprises an anonymous token set comprising a plurality of anonymous tokens, including the anonymous token, wherein the second request comprises an identifier of the anonymous token set of the distributed anonymous token set package, and wherein the second request does not comprise any of the plurality of anonymous tokens of the distributed anonymous token set package.

10. The method of claim 5, wherein the distributed anonymous token set package comprises an anonymous token set comprising a plurality of anonymous tokens, including the anonymous token, wherein the second request comprises a second anonymous token of the anonymous token set or an identifier of the anonymous token set, and wherein determining to revoke the trust relationship with the requesting entity further comprises:

determining, by the control plane, that at least one anonymous token of the anonymous token set was identified as being used maliciously; and determining, by the control plane, to revoke the trust relationship with the requesting entity based, at least in part, on the determining that at least one anonymous token of the anonymous token set was identified as being used maliciously.

11. The method of claim 5, wherein the distributed anonymous token set package comprises an anonymous token set comprising a plurality of anonymous tokens, including the anonymous token, wherein establishing the trust relationship with the requesting entity further comprises: providing, by the control plane, a license to the requesting entity, and wherein the second request further comprises a refresh request for the license.

12. The method of claim 11, wherein the license comprises an identifier of the anonymous token set, information regarding an expiration date or time, a refresh period, and a signature of the control plane, and wherein the refresh request comprises the identifier of the anonymous token set, the refresh period, and a signature using a public key of the control plane.

13. The method of claim 11, wherein determining to revoke the trust relationship with the requesting entity further comprises:

determining, by the control plane, to not renew the license of the refresh request.

14. The method of claim 11, wherein the refresh request for the license comprises an identifier of the anonymous token set, and wherein determining to revoke the trust relationship with the requesting entity further comprises:

determining, by the control plane, that at least one anonymous token of the plurality of anonymous tokens of the anonymous token set was identified as being used maliciously; and determining, by the control plane, to revoke the trust relationship with the requesting entity based, at least in part, on the determining that at least one anonymous token of the anonymous token set was identified as being used maliciously.

15. The method of claim 5, wherein establishing the trust relationship with the requesting entity further comprises:

receiving, by the control plane, the anonymous token of the distributed anonymous token set package from the requesting entity in a first request;

verifying, by the control plane, the anonymous token; and subsequent to verifying the anonymous token, establishing the trust relationship with the requesting entity.

16. The method of claim 15, wherein prior to receiving the anonymous token from the requesting entity, the method further comprises:

generating, at the control plane, an anonymous token set comprising a plurality of anonymous tokens, including the anonymous token;

generating, at the control plane, the anonymous token set package comprising the anonymous token set;

encrypting, by the control plane, the anonymous token set package; and distributing, by the control plane, the encrypted anonymous token set package to a software artifact, a software deployment orchestrator, a device, or a user.

17. One or more non-transitory computer-readable storage media configured with stored program instructions that when executed on or across one or more processors of an Information Handling System (IHS), cause the one or more processors to:

receive, from a requesting entity, a request to decrypt a part of a distributed anonymous token set package, wherein the distributed anonymous token set package comprises an anonymous token set comprising a plurality of anonymous tokens, including the anonymous token;

at least partially decrypt the part of the distributed anonymous token set package based at least in part on blind decryption, wherein the blind decryption does not allow the IHS to view contents of the part;

send the at least partially decrypted part of the distributed anonymous token set package to the requesting entity;

establish a trust relationship with the requesting entity based, at least in part, on a received first anonymous token of an anonymous token set of the distributed anonymous token set package, wherein the requesting entity obtained the received first anonymous token by decryption of the anonymous token set of the distributed anonymous token set package based at least in part on the at least partially decrypted part, and wherein to establish the trust relationship with the requesting entity, the program instructions further cause a control plane of the IHS to: provide a license to the requesting entity, wherein the license comprises an identifier of the anonymous token set, information in regard to an expiration date or time, a refresh period, and a signature of the control plane;

receive a second request comprising either a second anonymous token of the anonymous token set, or an identifier of the anonymous token set, wherein the second request further comprises a refresh request for the license, and wherein the refresh request comprises the identifier of the anonymous token set, the refresh period, and a signature based at least in part on a public key of the control plane; and subsequent to receiving the second request, determine to revoke the trust relationship with the requesting entity.

18. The one or more non-transitory computer-readable storage media of claim 17, wherein to determine to revoke the trust relationship with the requesting entity, the program instructions further cause the one or more processors to:

determine that at least one anonymous token of the anonymous token set was identified as being used maliciously; and determine to revoke the trust relationship with the requesting entity based, at least in part, on the determination that at least one anonymous token of the anonymous token set was identified as being used maliciously.

* * * * *